United States Patent
Zhang

(10) Patent No.: US 10,184,407 B2
(45) Date of Patent: Jan. 22, 2019

(54) METHOD AND SYSTEM FOR EMISSIONS REDUCTION

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 15/263,105

(22) Filed: Sep. 12, 2016

(65) Prior Publication Data

US 2018/0073444 A1 Mar. 15, 2018

(51) Int. Cl.
| | |
|---|---|
| *F01N 3/10* | (2006.01) |
| *F01N 3/20* | (2006.01) |
| *F01N 5/02* | (2006.01) |
| *F01N 5/04* | (2006.01) |
| *F02D 11/10* | (2006.01) |
| *F02D 41/00* | (2006.01) |
| *F02D 41/06* | (2006.01) |

(52) U.S. Cl.
CPC .......... *F02D 11/105* (2013.01); *F01N 3/2006* (2013.01); *F01N 5/02* (2013.01); *F01N 5/04* (2013.01); *F02D 41/0007* (2013.01); *F01N 3/101* (2013.01); *F01N 2240/02* (2013.01); *F01N 2340/06* (2013.01); *F01N 2410/03* (2013.01); *F01N 2410/06* (2013.01); *F02D 41/062* (2013.01)

(58) Field of Classification Search
CPC . F01N 3/2006; F01N 5/02; F01N 5/04; F01N 2240/02; F01N 2340/06; F01N 2410/03; F01N 2410/06; F01N 3/101; F02D 11/105; F02D 41/0007; F02D 41/062
See application file for complete search history.

(56) References Cited

U.S. PATENT DOCUMENTS

| 8,234,865 B2 | 8/2012 | Andrews |
| 8,555,636 B2 | 10/2013 | Schwarzenthal et al. |
| 2011/0253075 A1 | 10/2011 | Okada |

OTHER PUBLICATIONS

Uhrich, Michael James, et al., "Method and System for Exhaust Gas Heat Recovery," U.S. Appl. No. 15/010,382, filed Jan. 29, 2016, 70 pages.
Styles, Daniel Joseph, et al., "Method and System for Exhaust Gas Heat Recovery," U.S. Appl. No. 15/010,537, filed Jan. 29, 2016, 72 pages.

(Continued)

*Primary Examiner* — Brandon Lee
(74) *Attorney, Agent, or Firm* — Julia Voutyras; McCoy Russell LLP

(57) ABSTRACT

Methods and systems are provided for operating a branched exhaust assembly in a vehicle engine in order to increase catalyst efficiency and reduce engine emissions. In one example, a method may include, during a cold-start condition, flowing exhaust first through a three-way catalyst then through an underbody converter, then through a heat exchanger and then through a turbine, each exhaust component housed on different branches on the branched exhaust assembly. After catalyst activation, exhaust may flow first through the turbine, then through the underbody converter and then through the three-way catalyst, and during high engine load, exhaust entering the turbine may be cooled in order to reduce thermal load on the turbine.

20 Claims, 12 Drawing Sheets

(56) References Cited

OTHER PUBLICATIONS

Uhrich, Michael James, et al., "Exhaust Heat Recover and Hydrocarbon Trapping," U.S. Appl. No. 15/010,688, filed Jan. 29, 2016, 53 pages.
Zhang, Xiaogang, "Method and System for Emissions Reduction," U.S. Appl. No. 15/081,040, filed Mar. 25, 2016, 51 pages.
Uhrich, Michael James, et al., "Method and System for Exhaust Gas Heat Recovery," U.S. Appl. No. 15/151,341, filed May 10, 2016, 76 pages.
Zhang, Xiaogang, "Method and System Exhaust Aftertreatment," U.S. Appl. No. 15/218,639, filed Jul. 25, 2016, 94 pages.

| Exhaust system mode | Engine temperature | Engine load | Valve_1 position | Valve_2 position | Valve_3 position | Direction of exhaust flow |
|---|---|---|---|---|---|---|
| 1st | Cold start | Lower | First | First | First | First through catalyst, then underbody converter, and then turbine |
| 2nd | Warm | Lower | Second | Second | Second | First through turbine, then underbody converter, and then catalyst |
| 3rd | Warm | Higher | Second | Second | Third | First part of exhaust first through turbine, then underbody converter, and then catalyst and simultaneously a second part of exhaust through heat exchanger, turbine, then underbody converter, and then catalyst. |

FIG. 6

| Exhaust system mode | Engine temperature | Engine load | Valve_1 position | Valve_2 position | Valve_3 position | Valve_4 position | Direction of exhaust flow |
|---|---|---|---|---|---|---|---|
| 1st | Cold start | Lower | First | First | First | First | First through catalyst, then underbody converter, and then turbine |
| 2nd | Warm | Lower | Second | Second | Second | Second | First through turbine, then underbody converter, and then catalyst |
| 3rd | Warm | Higher | Second | Second | Second | Second | First through turbine, then underbody converter, and then catalyst and inject cooling fluid upstream of turbine |

FIG. 9

METHOD AND SYSTEM FOR EMISSIONS REDUCTION

FIELD

The present description relates generally to methods and systems for controlling a vehicle engine to reduce engine emissions and recover exhaust heat.

BACKGROUND/SUMMARY

Engines may be operated with boosted aircharge provided via a turbocharger wherein an intake compressor is driven by an exhaust turbine. However, placing a turbine in an exhaust system can increase engine cold-start emissions due to the turbine acting as a heat sink. In particular, during the engine cold-start, engine exhaust heat may be absorbed at the turbine, lowering the amount of exhaust heat that is received at a downstream exhaust catalyst. As such, this delays catalyst light-off. Consequently, spark retard may be required in order to activate the exhaust catalyst. The fuel penalty associated with the spark retard usage may offset or even outweigh the fuel economy benefit of the boosted engine operation. Also during the cold-start, due to lower than threshold cylinder wall and piston temperatures, there may be an increase in hydrocarbon emissions. Therefore, heat may need to be supplied to the engine to increase the temperature of the cylinder wall and piston.

Accordingly, various approaches have been developed to expedite the attainment of a catalyst light-off temperature during cold-start conditions in a boosted engine. One example approach, shown by Andrews in U.S. Pat. No. 8,23,4865, involves routing exhaust gas towards an exhaust tailpipe via a passage that bypasses the exhaust turbine during cold-start conditions. A passive, thermatically operated valve is used to regulate the flow of exhaust through the passage, the valve opening during low-temperature conditions (such as during cold-start). The thermatically operated valve comprises a bi-metallic element which distorts based on temperature thereby regulating the opening of the valve. By circumventing the turbine, exhaust heat may be directly delivered to the exhaust catalyst.

However, the inventors herein have recognized potential issues with such systems. As one example, heat from the exhaust may not be sufficiently recovered and used for expedited heating of the cylinder walls and piston. Due to the resulting lower cylinder temperature, hydrocarbon emissions may increase. Also, due to the exhaust bypassing the turbine, there may be a delay in turbine spin-up, resulting in turbo-lag and reduced boost performance. Furthermore, after catalyst light-off, the temperature of the unobstructed exhaust reaching the catalyst may be higher than desired. Owing to a coating on the catalyst surface (such as on the surface of an exhaust oxidation catalyst or three-way catalyst), the catalyst may have higher conversion efficiencies at lower exhaust temperatures. The higher than desired temperature of exhaust reaching the catalyst may result in reduced catalyst functionality.

The inventors herein have identified an approach by which the issues described above may be at least partly addressed. One example method for a boosted engine comprises: during cold-start, flowing exhaust first through a three-way catalyst, then an underbody converter, then an exhaust bypass passage with a heat exchanger, and then a turbine; transferring heat from exhaust to coolant circulating through the heat exchanger; and heating an engine cylinder and piston with exhaust heat recovered at the heat exchanger. In this way, exhaust heat may be used to increase cylinder wall and piston temperatures, and also expedite catalyst light-off.

In one example, a turbocharged engine system may be configured with a branched exhaust assembly wherein the exhaust passage, downstream of the exhaust manifold, is divided into at least three separate branches, each creating a distinct flow path. The branches may be interconnected to each other via valves such that an order of exhaust flow along each of the flow paths can be adjusted via adjustments to a position of the valves. Distinct exhaust components may be coupled to distinct branches of the branched exhaust assembly. For example, an exhaust turbine of the turbocharger may be coupled to a first branch, an underbody converter may be coupled to a second branch, and an exhaust oxidation catalyst (three-way catalyst) may be coupled to a third branch of the exhaust assembly. An exhaust bypass passage may also couple an engine coolant system to the first branch, upstream of the turbocharger, such that exhaust received in the first branch may be directly routed from upstream of the turbine into the bypass passage, without passing through the turbine. A heat exchanger may be coupled in the bypass passage wherein heat from the exhaust may be transferred to a coolant circulating through the heat exchanger. Adjustments to the position of a diverter valve may be used to control exhaust flow via the bypass passage. During cold-start conditions, a position of the exhaust system valves may be adjusted by an engine controller to flow exhaust first through the catalyst, then through the underbody converter, then through the bypass passage, and then through the turbine. Heat extracted from the exhaust by the coolant circulating through the heat exchanger may be used to increase cylinder wall and piston temperatures. After catalyst light-off, a position of the valves may be adjusted to flow exhaust first through the turbine, then through the underbody converter, and then through the catalyst. This allows for expedited turbine spin-up. During high engine load conditions, such as while operating with boost, a position of the valves may be adjusted such that exhaust may be simultaneously routed to the tailpipe through two separate flow paths. For example, a first portion of the exhaust may first flow through the bypass passage, then through the turbine, then through the underbody converter, and then through the light-off catalyst before exiting via the tail pipe. A second (remaining) portion of exhaust may flow first through turbine, then through the underbody converter, and then through the light-off catalyst before exiting via the tail pipe. The portion of the exhaust routed through the heat exchanger may be adjusted based on engine heating demands and engine load. Also during high engine load conditions, a cooling fluid may be injected into the exhaust flow upstream of the turbine to reduce the temperature of the exhaust entering the turbine.

In this way, by routing exhaust through different flow-paths of a branched exhaust assembly, it is possible to expedite attainment of catalyst light-off temperature while concurrently extracting exhaust heat, and providing boost to the engine during cold-start conditions. Specifically, exhaust can be flowed through each of a heat exchanger, a turbine, an exhaust catalyst, and an underbody converter, with an order of exhaust flow through the components adjusted based on operating conditions. By adjusting exhaust flow during cold-start conditions to route hot exhaust first through an exhaust catalyst, and then through a heat exchanger before flowing the exhaust through the remaining exhaust components, exhaust heat may be effectively used for heating catalyst, and other engine components. By adjusting the exhaust flow after catalyst activation to route the hot exhaust through an exhaust turbine before flowing the exhaust through the remaining exhaust components, turbo lag is reduced. In addition, a temperature of the exhaust received at the catalyst is lowered, improving catalyst conversion efficiency. The technical effect of recovering exhaust heat using an engine coolant is that heating of cylinder walls, and piston may be expedited, and hydrocarbon emissions may be reduced, especially during cold-start conditions. By routing exhaust via multiple flow paths in the exhaust assembly, it is possible to lower the temperature of exhaust flowing through the turbine thereby reducing the possibility of boost error, and turbine hardware malfunction during high engine load conditions. Also, by using a cooling liquid upstream of the turbine to reduce exhaust temperature, damage to turbine hardware may be reduced. Overall, by changing an order of exhaust flow through exhaust components, and recovering exhaust heat, engine efficiency, emissions quality, and fuel efficiency may be improved in a boosted engine system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table illustrating the different modes of operation of the first branched exhaust assembly.

FIG. 9 shows a table illustrating the different modes of operation of the second branched exhaust assembly.

DETAILED DESCRIPTION

Figure 1:
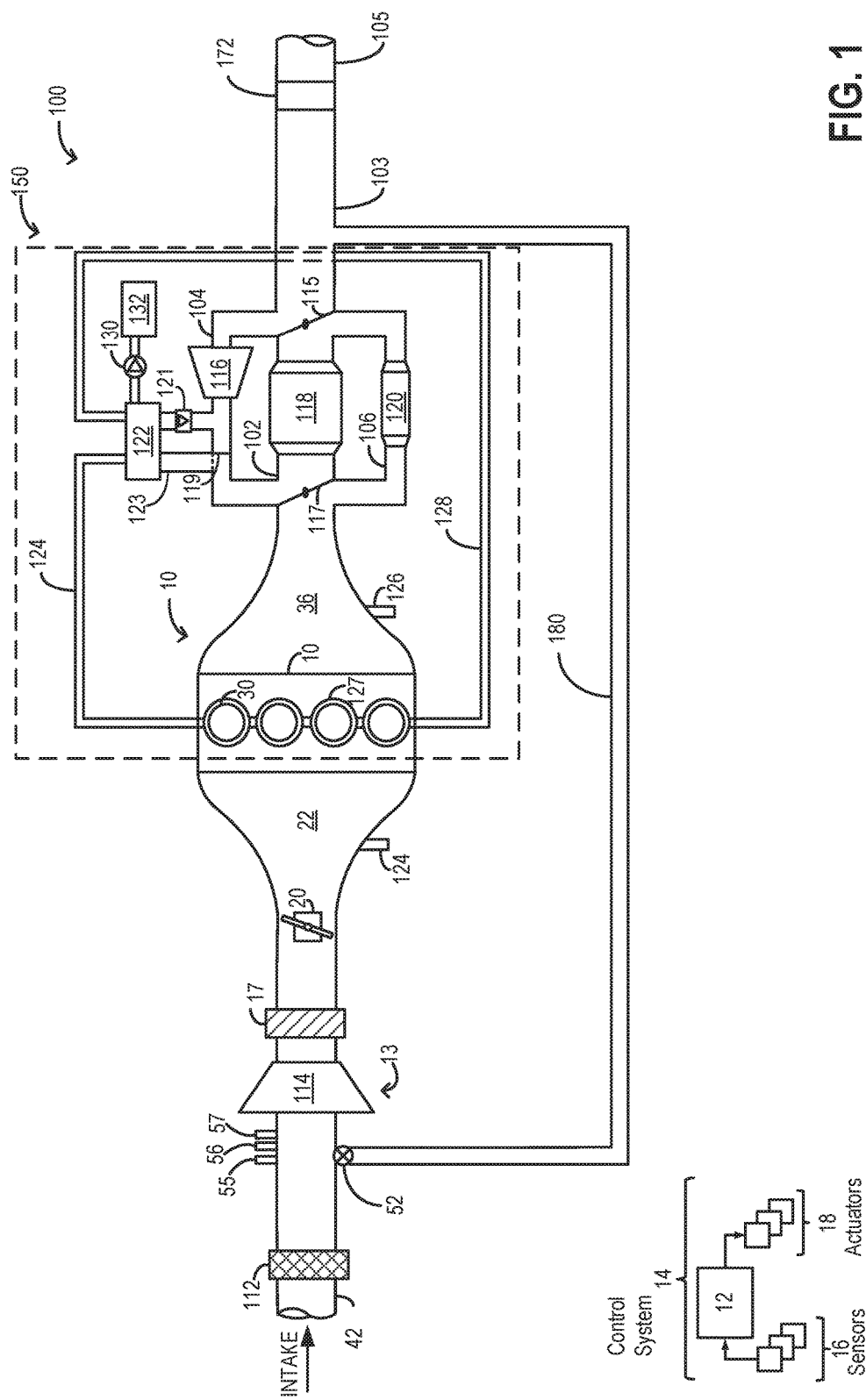
FIG. 1 shows an example embodiment of an engine system including a first branched exhaust assembly, and an exhaust heat exchanger.
Figure 2:
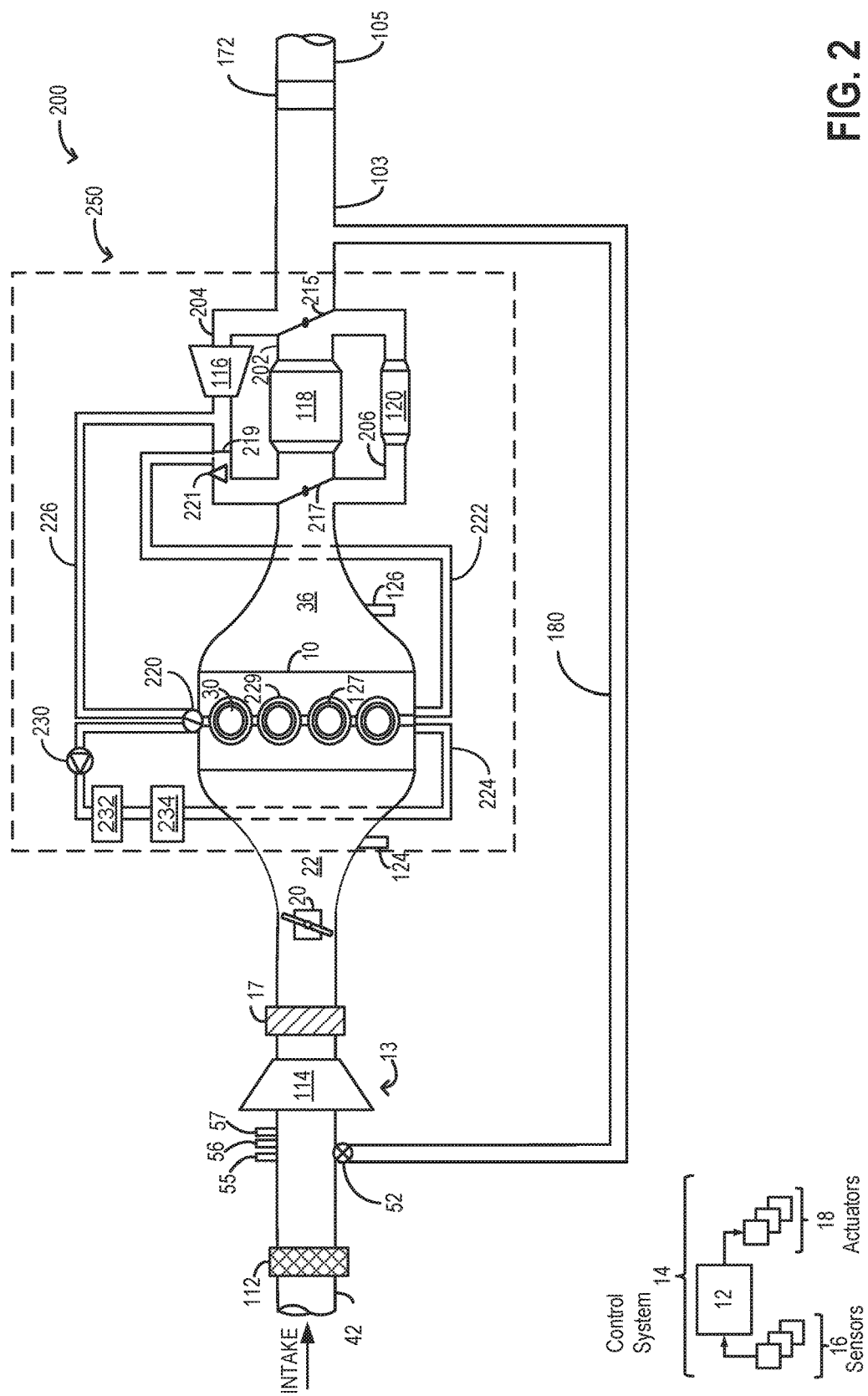
FIG. 2 shows an example embodiment of an engine system including a second branched exhaust assembly, and an exhaust heat recovery system.

The following description relates to systems and methods for reducing engine emissions, and recovering exhaust heat while providing boost to an engine system. Example engine systems comprising branched exhaust assemblies are shown in FIGS. 1 and 2. In the system of FIG. 1, a distinct heat exchanger is used to recover exhaust heat energy to be used for heating cylinder walls and piston. In the system of FIG. 2, the exhaust is routed through the engine cylinders, wherein a circulating coolant is used to transfer the exhaust heat to the cylinder walls and piston. The different modes of operation of the systems of FIGS. 1-2 are elaborated with reference to FIGS. 3A-3C and FIGS. 4A-4C. An engine controller may be configured to perform control routines, such as the example routines of FIGS. 5 and 8, to vary the position of the system valve(s) to thereby adjust exhaust flow through the branched exhaust assemblies of FIGS. 1 and 2, respectively. The different modes of operation of the branched exhaust assemblies of FIGS. 1 and 2 are tabulated in FIGS. 6, and 9 respectively. Example operations of the systems of FIGS. 1 and 2 are shown with reference to FIGS. 7 and 10 respectively.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor 114 is a turbocharger compressor mechanically coupled to turbine 116 via a shaft (not shown), the turbine 116 driven by expanding engine exhaust.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. In the embodiment shown in FIG. 1, the pressure of the air charge within the intake manifold is sensed by manifold air pressure (MAP) sensor 125.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

Intake manifold 22 is coupled to a series of combustion chambers 30 through a series of intake valves (not shown). The combustion chambers are further coupled to exhaust manifold 36 via a series of exhaust valves (not shown). In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via an injector (not shown). Fuel may be supplied to the combustion chambers via direct injection, port injection, throttle valve-body injection, or any combination thereof. In the combustion chambers, combustion may be initiated via spark ignition and/or compression ignition.

As shown in FIG. 1, the exhaust manifold 36 may lead to a branched exhaust assembly 150 wherein the exhaust passage 103 is divided into three separate branches, each creating a distinct flow path. The three branches are arranged substantially parallel to each other. The branches may be fluidically connected to each other via two four-way valves 117 and 115 such that an order of exhaust flow along each of the flow paths can be adjusted via adjustments to a position of each of valves 115 and 117. The first four-way valve 117 may be coupled to each of a first end of a first branch 104, a first end of a second branch 102, and a first end of a third branch 106. The second four-way valve may be coupled to each of a second end of the first branch 104, a second end of the second branch 102, and a second end of the third branch 106. Separate exhaust components may be coupled to each branch of the branched exhaust assembly. For example, the exhaust turbine 116 of the turbocharger 13 may be coupled to the first branch 104, an underbody converter 118 may be coupled to the second branch 102, and a three-way catalyst (TWC) 120 may be coupled to the third branch 106 of the exhaust assembly 150.

An exhaust bypass passage 123 may be coupled to the first branch 104 of the branched exhaust assembly 150 upstream of the turbine 116. A diverter valve 119 may be coupled at a junction of the first branch 104 and exhaust bypass passage 123 for regulating the flow of exhaust into the bypass passage 123 from first branch 104. In one example, the diverter valve 119 may be a continuously adjustable valve. In another example, the diverter valve 119 may be a three-way valve. The bypass passage may further include a heat exchanger 122 for cooling the flowing exhaust. Exhaust may flow from the first branch 104 to the first end of the heat exchanger 122 proximal to the exhaust manifold, via the diverter valve 119 and the bypass passage 123. A check valve, may be coupled to the bypass passage 123 downstream of heat exchanger 122, for enabling uni-directional flow of exhaust through the bypass passage from the second end of the heat exchanger 122 to the first branch 104 (and disabling exhaust flow from the first branch 104 to the second end of the heat exchanger 122). The heat exchanger may be coupled to a cooling reservoir 132 via a cooling pump 130. Coolant from the cooling reservoir 132 may be circulated through the heat exchanger 122, and as exhaust passes through the heat exchanger 122, heat from the hot exhaust may be transferred to the coolant. In one example, the heat exchanger 122 may be a water-gas exchanger. Upon transfer of heat from the exhaust to the coolant, the warmed coolant may be circulated to the engine for heating the cylinder walls and piston (as required) via first coolant line 124 and second coolant line 128. In one example, coolant from the heat exchanger 122 may flow via first coolant line 124 to coolant channels 127 surrounding each of the cylinders 30 and heat may be transferred from the coolant to the cylinders 30. Once the heat has been transferred from the coolant, the coolant may return to the heat exchanger 122 via the second coolant line 128. Coolant may also be circulated through a heater core based on vehicle cabin heating demand.

During cold-start conditions (e.g., a first condition), the valves 117, 115, and 119 may be adjusted to flow exhaust first through the third branch 106 housing the three-way catalyst 120, then through the second branch 102 housing the underbody converter 118, then through the heat exchanger 122, and finally through the first branch 104 housing the turbine 116. By routing the hot exhaust through the catalyst before flowing the exhaust through the remaining exhaust components, heat may be effectively transferred to the catalyst during the cold-start to expedite attainment of catalyst light off. By flowing the hot exhaust through the heat exchanger 122, exhaust heat may be effectively transferred to a coolant circulating through the heat exchanger and the engine cylinders, and the extracted heat (from exhaust) may be used for heating cylinder walls and pistons, and cabin heating. Heating the cylinder walls and pistons may result in decreasing cold-start hydrocarbon emissions. By flowing the exhaust through the turbine 116, boost may be provided to the engine even during cold-start conditions. After three-way catalyst light-off (e.g., a second condition), the valves 117, 115, and 119 may be adjusted to flow exhaust first through the first branch 104 housing the turbine 116, then through the second branch 102 housing the underbody converter 118, and then through the third branch 106 housing the three-way catalyst 120. By adjusting the exhaust flow to route the hot exhaust through the turbine 116 before flowing the exhaust through the remaining exhaust components, turbo lag may be reduced. In addition, a temperature of the exhaust received at the catalyst 120 may be lowered, thereby improving catalyst conversion efficiency. At this time, since the engine temperature is above a threshold temperature (causing catalyst activation), exhaust heat recovery for cylinder and piston heating may no longer be desired, and therefore exhaust may not be routed via the heat exchanger 122. During higher than threshold load operations (third condition), the valves 117, 115, and 119 may be adjusted to flow exhaust first through the first branch 104. The degree of opening (angle) of the diverter valve 119 may be adjusted to flow a first portion of exhaust may be into the bypass passage 123 from upstream of the turbine 116 in the first branch 104. The first portion of exhaust may then flow via the heat exchanger 122 before returning to the first branch 104. In this way, the first portion of exhaust may be cooled at the heat exchanger 122 and routed through the turbine 116 indirectly. Simultaneously, a second portion of exhaust may be routed directly through the turbine, bypassing the heat exchanger. In this way, by cooling only a portion of the exhaust entering the turbine, the temperature of exhaust gas entering the turbine 116 may be better controlled. Consequently, the thermal load on the turbine may be reduced, which may reduce turbine speed and in turn may help to reduce the likelihood of turbine system component damage. The first, and the second portion of the exhaust exiting the turbine 116 may then flow through the second branch 102 housing the underbody converter 118, and then through the third branch 106 housing the three-way catalyst 120. A ratio of the first portion to the second portion may be adjusted based on driver demand and boost error, the adjusting including decreasing the first portion while correspondingly increasing the second portion as the driver demand increases, and increasing the first portion while correspondingly decreasing the second portion as the boost error increases, the boost error including a difference between an actual boost and a desired boost. Based on the estimated ratio of the first portion to the second portion, the degree of opening (angle) of the diverter valve 119 may be adjusted. All or part of the treated exhaust exiting the branched exhaust assembly 150 may flow downstream via exhaust passage 103 and may be released into the atmosphere via tailpipe 105 after passing through a muffler 172. Detailed description of the operation and structure of the branched exhaust assembly 150 will be discussed with relation to FIGS. 2A, 2B, 2C, 5, 6, and 7.

In another example embodiment, one exhaust after-treatment device may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Exhaust gas recirculation (EGR) passage 180 may be coupled to the exhaust passage 103 at a location downstream of branched exhaust assembly 150 for delivery of low-pressure EGR (LP-EGR) from downstream of the turbine 116 in the exhaust passage 103 to the intake manifold 22 upstream of the compressor 114. Depending on operating conditions such as engine temperature, a portion of the exhaust residuals may be diverted to the inlet of compressor 114 via exhaust gas recirculation (EGR) valve 52 and EGR passage 180. EGR valve 52 may be opened to admit a controlled amount of exhaust to the compressor inlet for desirable combustion and emissions control performance. EGR valve 52 may be configured as a continuously variable valve. In an alternate example, however, EGR valve 52 may be configured as an on/off valve.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 160 located upstream of the branched exhaust assembly 150, MAP sensor 125, exhaust temperature sensor, exhaust pressure sensor, engine coolant temperature sensor, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, throttle 20, EGR valve 52, four-way valves 117 and 115, diverter valve 119, check valve 121, cooling pump 130, and fuel injector. The control system 14 may include a controller 12. The controller 12 may receive input data from the various sensors, process the input data, and trigger various actuators in response to the processed input data based on instruction or code programmed therein corresponding to one or more routines. For example, based on engine operating conditions such as engine temperature and engine load, the controller 12 may regulate the opening of the four-way valves 117 and 115, and the diverter valve 119 to direct exhaust through the different flow-paths of the branched exhaust assembly 150. An example control routine is described with regard to FIG. 5. As another example, also based on engine operating conditions, opening of EGR valve 52 may be adjusted to draw a desired amount of EGR from the exhaust passage 103 into the engine intake manifold.

An alternate embodiment of the engine system of FIG. 1 is shown in FIG. 2 and elaborated below with reference to example engine system 200. The different modes of operation of the exhaust bypass assembly of FIG. 2 are elaborated with reference to FIGS. 4A-4B.

Figure 3A:
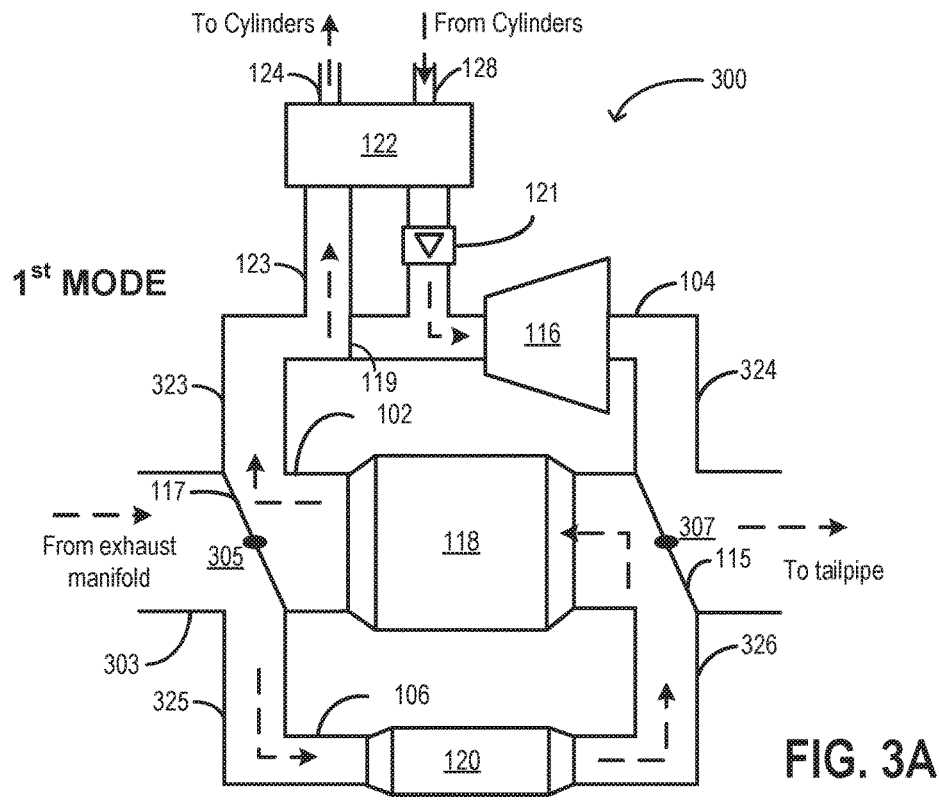
FIG. 3A shows an example embodiment of the first branched exhaust assembly of FIG. 1 operating in a first mode.

Turning now to FIG. 3A, an example embodiment 300 of operating the branched exhaust assembly of FIG. 1 in a first operating mode is shown. In one example, assembly 300 is an embodiment of assembly 150 of FIG. 1 and therefore may share common features and/or configurations as those already described for branched exhaust assembly 150.

The branched exhaust assembly 300 is disposed on the main exhaust passage 303 downstream of the engine exhaust manifold and upstream of the tailpipe. At junction 305, the main exhaust passage 303 may divide into three separate branches each creating a distinct flow-path. A first four-way valve 117 may be coupled to the main exhaust passage 303 at a first end (proximal to the exhaust manifold) of each of the three branches, specifically at the junction 305. The valve 117 may be actuated to one of two different positions in order to regulate the direction of exhaust flow through the three branches based on engine operating conditions. A second four-way valve 115 may be coupled to the main exhaust passage 303 at a second end (proximal to the tailpipe) of each of the three branches (at the junction 307). The valve 115 may be positioned in two different configurations in order to regulate the direction of exhaust flow through the three branches based on engine operating conditions. The valves 117 and 115 fluidically connect the three branches and may be actuated in a coordinated manner to facilitate desired flow of exhaust through the branched exhaust assembly 300.

A first inlet pipe 323 may originate from the main exhaust passage 203 at the junction 305. The first inlet pipe 323 may lead to the first branch 104. A turbine 116 may be housed in the first branch 104. In one example, the turbine 116 may be a variable geometry turbine. Downstream of the turbine 116, a first outlet pipe 324 may originate from the first branch 104 and terminate at a junction 307 of the exhaust assembly 300. An exhaust bypass passage 123 may be coupled to the first branch 104 upstream of the turbine 116. A diverter valve 119 may be coupled to the junction of the first branch 104 and the bypass passage 123. In one example, the diverter valve 119 may be a continuously adjustable valve and the degree of opening of the valve 119 may be adjusted based on the desired exhaust flow through the bypass passage 123. A heat exchanger 122 may be housed in the bypass passage 123, and a check valve may be coupled to the bypass passage 123 downstream of the heat exchanger 122. A first coolant line 124, and a second coolant line 128 may couple the heat exchanger 122 to coolant channels surrounding the engine cylinders.

A part of the main exhaust passage 303 may constitute the second branch 102. The second branch (flow-path) 102 may originate at the junction 305 and may end (merge with the main exhaust passage 303) at junction 307. An underbody converter 118 may be housed in the second branch 102. In an alternate embodiment, for a diesel engine, a diesel particulate filter (DPF) or a selective catalytic reduction (SCR) device may be housed in the second branch 102. A second inlet pipe 325 may originate from the main exhaust passage 303 at the junction 305. The second inlet pipe 325 may lead to the third branch 106. A three-way catalyst (TWC) 120 may be housed in the third branch 106. Downstream of the catalyst 120, a second outlet pipe 326 may originate from the branch 106 and terminate at a junction 307 of the exhaust assembly. In an alternate embodiment, for a diesel engine, a diesel oxidation catalyst may be housed in the third branch 106. The three branches (flow-paths) 104, 102, and 106 may be largely parallel to each other.

Based on engine operating conditions and temperature requirement at each exhaust component (turbine, underbody converter and catalyst), the order of exhaust flow through each of the components may be adjusted without the requirement of bypassing any component. Based on the position of the valves 117, 115, in coordination with valve 119, exhaust may be routed from the main exhaust passage 203 through each of the branches of the exhaust assembly 300 (in different orders). The exhaust assembly 300 may be operated in three operational modes based on the selected position of the valves.

The first operating mode represents a first setting of the four-way valves 117 and 115, and the diverter valve 119 that enables exhaust flow control. In the first operating mode, the first four-way valve 117 may be in a first position, the second four-way valve 115 may be in a first position, and the diverter valve 119 may be in a completely open position. When in the first operating mode, due to the first position of the first valve 117, the entire volume of exhaust flowing downstream via the main exhaust passage 303 may enter the second inlet pipe 325 at junction 305. From the second inlet pipe 325, the exhaust may continue to flow through the three-way catalyst (TWC) 120 housed in the third branch 106 of the exhaust assembly 300 in a first direction (from a first end of the TWC proximal to the engine exhaust manifold to the second end of the TWC proximal to the tailpipe). After exiting the TWC 120, the exhaust continues to flow downstream via the third branch 106 into the second outlet pipe 326. Due to the first position of the second valve 115, upon reaching the junction 307, the exhaust may be routed through the underbody converter 118 housed in the second branch 102 in a second direction (from a second end of the underbody converter proximal to the tailpipe to the first end of the underbody converter proximal to the engine exhaust manifold). Herein, the second direction of exhaust flow through the second branch is opposite to the first direction of exhaust flow through each of the first branch and the third branch. After exiting the underbody converter 118, the exhaust continues to flow via the second branch 102 towards the junction 305. At the junction 305, the exhaust may then enter the first inlet pipe 323. From the first inlet pipe 323, the exhaust may enter the first branch 104. Due to the open position of the diverter valve 119, the exhaust may not continue to flow downstream via the first branch 104, and may be routed into the bypass passage 123 instead. The exhaust may then flow through the heat exchanger 122 housed in the bypass passage 123, and reenter the first branch 104 upstream of the turbine. A coolant may be circulated through the heat exchanger to extract heat from the exhaust flowing through the heat exchanger 122. The coolant heated via the recovered exhaust heat may then be routed to coolant channels surrounding the engine cylinder via a first coolant line 124. After flowing around the engine cylinders via the coolant channels, the coolant may return to the heat exchanger via a second coolant line 128.

The exhaust may then flow through the turbine 116 housed in the first branch 104 of the exhaust assembly 300 in the first direction of exhaust flow (from a first end of the turbine proximal to the engine exhaust manifold to the second end of the turbine proximal to the tailpipe). After exiting the turbine 116, the exhaust may continue to flow downstream via the first branch 104 into the first outlet pipe 324. Upon reaching the junction 307 (via the first outlet pipe 324), the exhaust may exit the branched exhaust assembly 300 and may continue to flow downstream towards the tailpipe via the main exhaust passage 303.

The branched exhaust assembly may be operated in the first operating mode (as described above) during cold-start conditions. By adjusting exhaust flow to route hot exhaust first through the TWC 120, before flowing the exhaust through the remaining exhaust components (turbine 116 and underbody converter 118), exhaust heat may be effectively transferred to the catalyst, expediting catalyst activation. Therefore, hot exhaust may be effectively used for increasing TWC temperature, reducing the need for spark retard, thereby increasing fuel efficiency of the engine. By attaining the TWC 120 light-off temperature faster, cold-start emissions quality may be improved. By flowing the exhaust through a heat exchanger, heat from the exhaust may be recovered and used for heating cylinder walls and pistons, which may also reduce cold-start hydrocarbon emissions. Also, by routing the exhaust through the turbine 116 during cold-start conditions, delays in turbine spin-up may be reduced, thereby reducing turbo-lag and enhancing boosted engine performance.

Figure 3B:
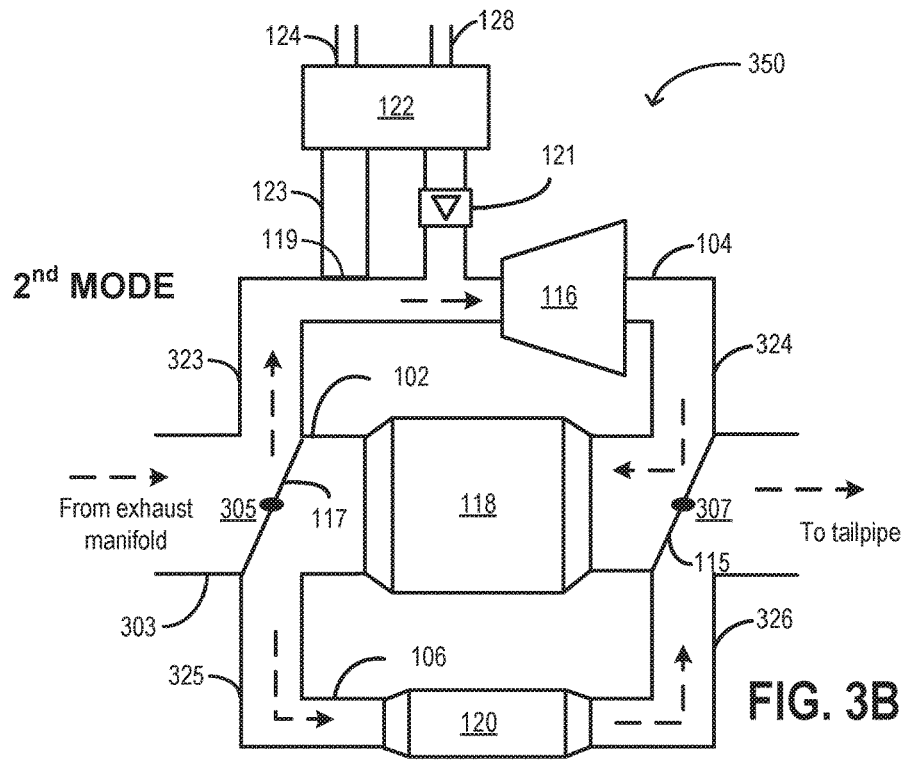
FIG. 3B shows an example embodiment of the first branched exhaust assembly of FIG. 1 operating in a second mode.

FIG. 3B shows a schematic view 350 of an example embodiment of the exhaust bypass assembly 300 of FIG. 3A in a second operating mode. Components previously introduced in FIG. 3A are numbered similarly and not reintroduced.

The second operating mode represents a second setting of the four-way valves 117 and 115, and the diverter valve 119 that enables exhaust flow control. In the second operating mode, the first four-way valve 117 may be in a second position, the second four-way valve 215 may be in a second position, and the diverter valve 119 may be in a closed position. When in the second operating mode, due to the second position of the first valve 117, the entire volume of exhaust flowing downstream via the main exhaust passage 303 may enter the first inlet pipe 323 at junction 305. Due to the closed position of the diverter valve 119, the entrance to the bypass passage 123 may be blocked, and exhaust may not enter the bypass passage 123. Therefore, from the first inlet pipe 323, the exhaust may continue to flow through the turbine 116 housed in the first branch 104 of the exhaust assembly 300, in a first direction (from a first end of the turbine proximal to the engine exhaust manifold to the second end of the turbine proximal to the tailpipe). After exiting the turbine 116, the exhaust continues to flow downstream via the first branch 104 onto the first outlet pipe 324. Due to the second position of the second valve 115, upon reaching the junction 307, the exhaust may be routed through the underbody converter 118 housed in the second branch 102 in a second direction (from a second end of the underbody converter proximal to the tailpipe to the first end of the underbody converter proximal to the engine exhaust manifold), the second direction opposite the first direction. After exiting the underbody converter 118, the exhaust continues to flow via the second branch 102 towards the junction 305. At the junction 305, the exhaust may then enter the second inlet pipe 325. From the second inlet pipe 325, the exhaust may flow through the three-way catalyst (TWC) 120 housed in the third branch 106 of the exhaust assembly 300, in the first direction (from a first end of the TWC proximal to the engine exhaust manifold to the second end of the TWC proximal to the tailpipe). After exiting the TWC 120, the exhaust may continue to flow downstream via the third branch 106 onto the second outlet pipe 326. Upon reaching the junction 307 (via the second outlet pipe 326), the exhaust may exit the branched exhaust assembly 300 and may continue to flow downstream towards the tailpipe via the main exhaust passage 203.

The branched exhaust assembly may be operated in the second operating mode (as described above) once the TWC 120 is fully activated (after attainment of light-off temperature), and while exhaust heat recovery may no longer be desired to increase the engine temperature. During this time, the engine load may be low/moderate and engine temperature may be higher. By adjusting exhaust flow to route hot exhaust first through the turbine 116, boost performance may be enhanced in the low-medium load region. Once the exhaust passes through the turbine 116, the temperature of the exhaust may drop. Owing to a coating on the catalyst surface, the TWC 120 may have a higher conversion efficiency at lower exhaust temperatures. As a result, the low temperature exhaust reaching the TWC 120 (after passing through turbine 116) may result in an optimal performance of the TWC 120.

Figure 3C:
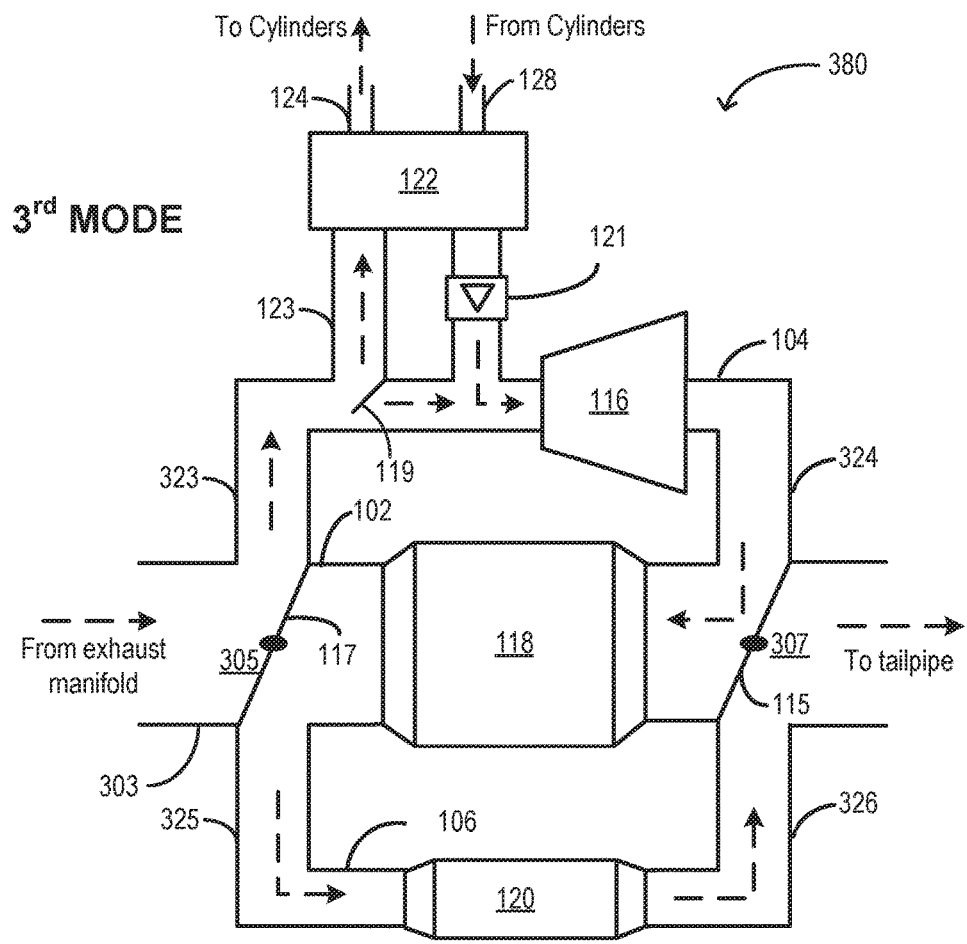
FIG. 3C shows an example embodiment of the first branched exhaust assembly of FIG. 1 operating in a third mode.

FIG. 3C shows a schematic view 380 of an example embodiment of the exhaust bypass assembly 300 in a third operating mode. The third operating mode represents a third setting of the four-way valves 117 and 115, and the diverter valve 119 that enables exhaust flow control. In the third operating mode, each of the first four-way valve 117 and the second four-way valve may be maintained in the second position while the diverter valve 119 may be shifted to a partly open position. In the partly open position of the diverter valve 119, the degree of opening of the valve 119 may be adjusted based on the desired exhaust flow through the bypass passage 123 and the first branch 104. When in the third operating mode, due to the second position of the first valve 117, exhaust flowing downstream via the main exhaust passage 203 may first enter the first branch 104. Due to the partly open position of the diverter valve 119, a first portion of exhaust may enter the bypass passage 123, and flow through the heat exchanger before returning to the first branch 104, and flowing through the turbine 116 in a first direction (from a first end of the turbine proximal to the engine exhaust manifold to the second end of the turbine proximal to the tailpipe). Simultaneously, a second portion of exhaust may be routed directly through the turbine (also in the first direction), bypassing the bypass passage with the heat exchanger. A ratio of the first portion to the second portion may be determined based on driver demand and boost error, and the ratio may be adjusted by adjusting the position of the diverter valve 119. Based on the estimated ratio of the first portion to the second portion, the degree of opening of the diverter valve 119 may be adjusted.

After exiting the turbine 116, the exhaust (including first and second portions combined) continues to flow downstream via the first branch 104 onto the first outlet pipe 324. Due to the second position of the second valve 115, upon reaching the junction 307, the exhaust may be routed through the underbody converter 118 housed in the second branch 102 in a second direction (from a second end of the underbody converter proximal to the tailpipe to the first end of the underbody converter proximal to the engine exhaust manifold). After exiting the underbody converter 118, the exhaust continues to flow via the second branch 102 towards the junction 305. At the junction 305, the exhaust may then enter the second inlet pipe 325. From the second inlet pipe 325, the exhaust may continue to flow through the three-way catalyst (TWC) 120 housed in the third branch 106 of the exhaust assembly 300, in a first direction (from a first end of the TWC proximal to the engine exhaust manifold to the second end of the TWC proximal to the tailpipe). After exiting the TWC 120, the exhaust may continue to flow downstream via the third branch 106 onto the second outlet pipe 326. Upon reaching the junction 307 (via the second outlet pipe 326), the exhaust may exit the branched exhaust assembly 300 and may continue to flow downstream towards the tailpipe via the main exhaust passage 303.

The branched exhaust assembly may be operated in the third operating mode (as described above) during conditions of high engine load. Under such circumstances, by simultaneously flowing exhaust via two flowpaths of the exhaust assembly, the first portion of the exhaust may be cooled before passing through the turbine 116. In this way, by cooling a part of the exhaust entering the turbine, the temperature of exhaust reaching the turbine may be better controlled, and thermal load on the turbine may be reduced, which in turn may reduce the turbine speed. By reducing the temperature of the exhaust passing through the turbine 116, hardware damage to the turbine components may be reduced. The ratio of the first portion of the exhaust to the second portion may be based on driver demand and/or boost error. In one example, due to an increase in the driver demand, the first portion may be decreased and the second portion may be correspondingly increased. In another example, due to a decrease in driver demand, the first portion may be increased and the second portion may be correspondingly decreased. In yet another example, during larger boost errors, the second portion may be increased such that a larger volume of hot exhaust may be cooled before entering the turbine thereby reducing boost error. Boost error may be determined based on a difference between a desired boost and the actual boost. Therefore, during high load conditions, boosted performance may be maintained without the requirement of an additional wastegate valve and passage. In this way, based on engine operating conditions and temperature requirements of each component, exhaust may be routed through all three components in the branched exhaust system 300.

As an example, transitioning from the first to the second mode may be responsive to activation of the three-way catalyst 118, transitioning from the second mode to the third mode may be responsive to an increase in demanded torque (e.g., higher than threshold engine load), and transitioning from the third mode to the first mode may be responsive to an engine shutdown request. In this way, a plurality of multi-way valves may be used to regulate exhaust flow through different flow-paths in a branched exhaust assembly operating in different modes.

The three example modes of operation of the branched exhaust assembly of FIG. 1 as discussed above are tabulated in FIG. 6. Line 602 of table 600 shows operation of the branched exhaust assembly in the first mode as described in FIG. 3A, line 604 shows operation of the branched exhaust assembly in the second mode as described in FIG. 3B, and line 606 shows operation of the branched exhaust assembly in the third mode as described in FIG. 3C.

Moving on to FIG. 2, example engine system 200 is an alternate embodiment of engine system 100 shown in FIG. 1. Components previously introduced in FIG. 1 are numbered similarly and not reintroduced. Similar to the embodiment of FIG.1, engine system 200 of FIG. 2 may further include control system 14 for controlling engine operations. As seen in FIG. 2, engine system 200 includes a branched exhaust assembly 250.

In this embodiment, the exhaust manifold 36 may lead to a branched exhaust assembly 250 wherein the exhaust passage 103 is divided into three separate branches, each creating a distinct flow path. The branches may be fluidically connected to each other via two four-ways valves 217 and 215 such that an order of exhaust flow along each of the flow paths can be adjusted via adjustments to a position of each of the valves. Separate exhaust components may be coupled to each branch of the branched exhaust assembly. For example, the exhaust turbine 116 of the turbocharger 13 may be coupled to a first branch 204, an underbody converter 118 may be coupled to a second branch 202, and a three-way catalyst (TWC) 120 may be coupled to a third branch 206 of the exhaust assembly 250.

A first exhaust passage 222 and a second exhaust passage 226 may be coupled to the first branch 204 upstream of the turbine 116. The first exhaust passage 222 and the second exhaust passage 226 may couple exhaust channels 229 surrounding each of the cylinders 30 to the first branch 204. A first there-way valve 219 may be coupled to the first branch 204 at the junction of the first branch, and the first exhaust passage 222, and a second three-way valve 220 may be coupled to the junction of the second exhaust passage 226, and exhaust channels 229. The exhaust channels 229 may be concentric to the coolant channels 127 such that when exhaust flows through the exhaust channels 229, heat from the exhaust may be transferred to the coolant flowing there-through. Exhaust from the first branch 204 may be routed through the exhaust channels 229 via the first exhaust passage 222, and after flowing through the exhaust channels 229, the exhaust may return to the first branch 204 via the second exhaust passage 226. A coolant line 224 may be coupled to the coolant channels 127 via the second three-way valve 220. A cooling pump 230, a cooling reservoir 232, and a radiator 234 may be housed in the coolant line 224. Coolant from the cooling reservoir 232 may be circulated through the coolant line 224, and the coolant channels 127 via the pump 230. During conditions when exhaust heat is not desired for increasing engine temperature, the heat may be dissipated to the atmosphere via the radiator 234.

An injector 221 may be coupled to the first branch 204 upstream of the first three-way valve 219. In order to reduce exhaust temperature to a desired temperature before reaching the turbine, a cooling fluid such as cold water may be injected to the exhaust flow.

During cold-start conditions (first condition), the valves 217, 215, 219, and 220 may be adjusted to flow exhaust first through the third branch 206 housing the three-way catalyst 120, then through the second branch 202 housing the underbody converter 118, and then through the exhaust channels 229, and finally through the first branch 104 housing the turbine 116. By first routing the hot exhaust through the catalyst, before flowing the exhaust through the remaining exhaust components, heat may be effectively transferred to the catalyst to expedite attainment of catalyst light off. By flowing the hot exhaust through the exhaust channels 229, exhaust heat may be effectively transferred to a coolant circulating through the coolant channels 127, and the extracted heat (from exhaust) may be used for heating cylinder walls, and pistons. Heating the cylinder walls, and pistons may result in decreasing cold-start hydrocarbon emissions. By flowing the exhaust through the turbine 116, boost may be provided to the engine even during cold-start conditions. After catalyst activation (second condition), the valves 217, 215, 219, and 220 may be adjusted to flow exhaust first through the first branch 204 housing the turbine 116, then through the second branch 202 housing the underbody converter 118, and then through the third branch 106 housing the three-way catalyst 120. By adjusting the exhaust flow to route the hot exhaust through the turbine 116 before flowing the exhaust through the remaining exhaust components, turbo lag may be reduced. In addition, a temperature of the exhaust received at the catalyst 120 may be lowered thereby improving catalyst conversion efficiency. At this time, since the engine temperature has increased to above a threshold temperature (causing catalyst activation), exhaust heat recovery for cylinder, and piston heating may no longer be desired, and therefore exhaust may not be routed via the exhaust channels 229. During, high engine load conditions (third condition), the exhaust may continue to be routed first through the first branch 204 housing the turbine 116, then through the second branch 202 housing the underbody converter 118, and then through the third branch 106 housing the three-way catalyst 120. However, in order to decrease the temperature of the exhaust entering the turbine, a cooling fluid such as water may be injected to the exhaust flow upstream of the turbine via the injector 221. In this way, by cooling the exhaust entering the turbine, the thermal load on the turbine may be reduced which may reduce turbine speed and in turn may help to reduce the likelihood of hardware damage to the turbine components. All or part of the treated exhaust exiting the branched exhaust assembly 250 may flow downstream via exhaust passage 103 and may be released into the atmosphere via tailpipe 105 after passing through a muffler 172. Detailed description of the operation and structure of the branched exhaust assembly 250 will be discussed with relation to FIGS. 4A, 4B, 4C, 8, 9, and 10.

Figure 4A:
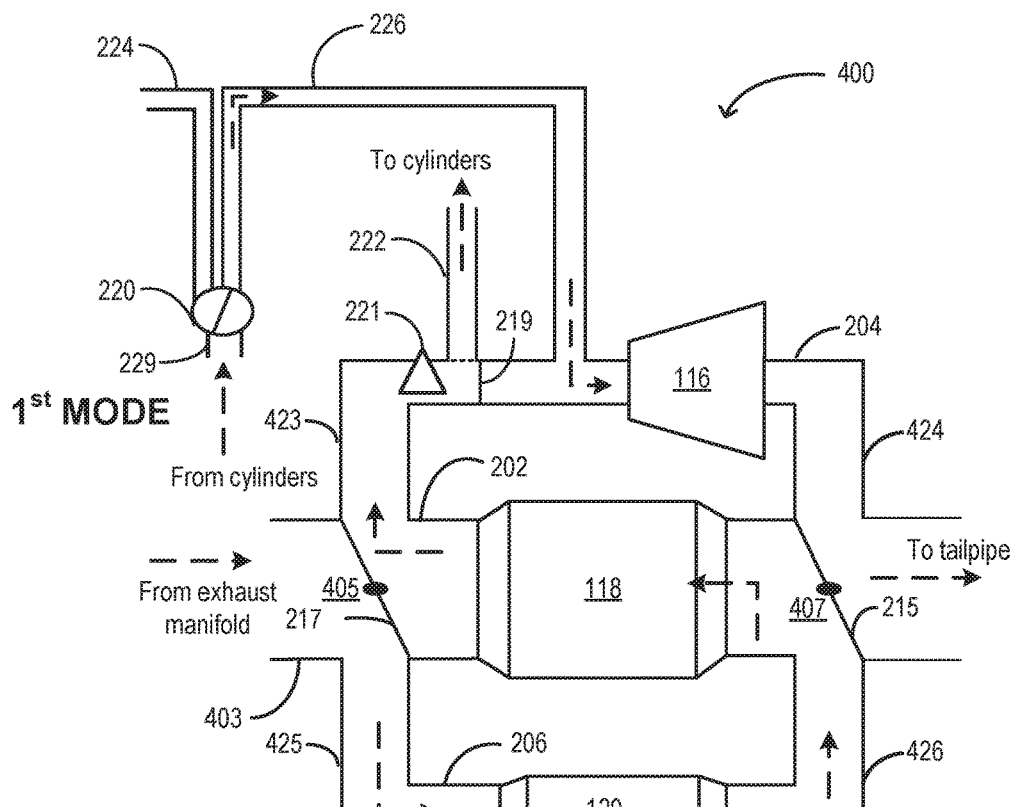
FIG. 4A shows an example embodiment of the second branched exhaust assembly of FIG. 2 operating in a first mode.

FIG. 4A further elaborates the branched exhaust assembly introduced in FIG. 2 and shows an example embodiment 400 of operating the branched exhaust assembly in a first operating mode. In one example, assembly 400 is an embodiment of assembly 250 of FIG. 2 and therefore may share common features and/or configurations as those already described for branched exhaust assembly 250.

The branched exhaust assembly 400 is disposed on the main exhaust passage 403 downstream of the engine exhaust manifold and upstream of the tailpipe. At junction 405, the main exhaust passage 403 may divide into three separate branches each creating a distinct flow-path. A first four-way valve 217 may be coupled to the main exhaust passage 403 at a first end (proximal to the exhaust manifold) of each of the three branches, specifically at the junction 405. The valve 217 may be actuated to one of two different positions in order to regulate the direction of exhaust flow through the three branches based on engine operating conditions. A second four-way valve 215 may be coupled to the main exhaust passage 403 at a second end (proximal to the tailpipe) of each of the three branches (at the junction 307).

The valve 215 may be positioned in two different configurations in order to regulate the direction of exhaust flow through the three branches based on engine operating conditions. The valves 217 and 215 fluidically connect the three branches and may be actuated in a coordinated manner to facilitate desired flow of exhaust through the branched exhaust assembly 400.

A first inlet pipe 423 may originate from the main exhaust passage 403 at the junction 405. The first inlet pipe 423 may lead to the first branch 204. A turbine 116 may be housed in the first branch 204. In one example, the turbine 116 may be a variable geometry turbine. Downstream of the turbine 116, a first outlet pipe 324 may originate from the first branch 204 and terminate at a junction 407 of the exhaust assembly 400. A first exhaust passage 222 and a second exhaust passage 226 may be coupled to the first branch 204 upstream of the turbine. A first three-way valve 219 may be coupled to the first branch 204 at the junction of the first branch 204 and the first exhaust passage 222. Each of the first exhaust passage 222 and the second exhaust passage 226 may be coupled to exhaust channels 229. The exhaust channels may be concentric to the coolant channels (such as coolant channels 127 in FIG. 2) which may surround the engine cylinders. Coolant may flow through the coolant channels via a coolant line 224. A second three-way valve 220 may be coupled to the second exhaust passage 226 at the junction of the second exhaust passage 226, and the exhaust channels 229. Each of the three-way valves 219, and 220 may be positioned in two different configurations in order to regulate exhaust flow through the exhaust channels 229.

A part of the main exhaust passage 403 may constitute the second branch 202. The second branch (flow-path) 202 may originate at the junction 405 and may end (merge with the main exhaust passage 403) at junction 407. An underbody converter 118 may be housed in the second branch 202. In an alternate embodiment, for a diesel engine, a diesel particulate filter (DPF) or a selective catalytic reduction (SCR) device may be housed in the second branch 202. A second inlet pipe 425 may originate from the main exhaust passage 403 at the junction 405. The second inlet pipe 425 may lead to the third branch 206. A three way catalyst (TWC) 120 may be housed in the third branch 206. Downstream of the catalyst 120, a second outlet pipe 426 may originate from the branch 206 and terminate at a junction 407 of the exhaust assembly. In an alternate embodiment, for a diesel engine, a diesel oxidation catalyst may be housed in the third branch 206. The three branches (flow-paths) 204, 202, and 206 may be substantially parallel to each other.

Based on engine operating conditions and temperature requirement at each exhaust component (turbine, underbody converter and catalyst), the order of exhaust flow through each of the components may be adjusted without the requirement of bypassing any component. Based on the position of the valves 117, 115, 119, and 220, exhaust may be routed from the main exhaust passage 303 through each of the branches of the exhaust assembly 400 (in different orders). The exhaust assembly 400 may be operated in three operational modes.

As such, the first operating mode represents a first setting of the four-way valves 217 and 215, and the three-way valves 219 and 220 that enables exhaust flow control. In the first operating mode, the first four-way valve 217 may be in a first position, the second four-way valve 215 may be in a first position, the first three-way valve 219 may be in a first position and the second three-way valve 219 may also be in a first position. When in the first operating mode, due to the first position of the first valve 217, the entire volume of exhaust flowing downstream via the main exhaust passage 403 may enter the second inlet pipe 425 at junction 405. From the second inlet pipe 425, the exhaust may continue to flow through the three-way catalyst (TWC) 120 housed in the third branch 206 of the exhaust assembly 400 in a first direction (from a first end of the TWC proximal to the engine exhaust manifold to the second end of the TWC proximal to the tailpipe). After exiting the TWC 120, the exhaust continues to flow downstream via the third branch 106 into the second outlet pipe 426. Due to the first position of the second valve 115, upon reaching the junction 407, the exhaust may be routed through the underbody converter 118 housed in the second branch 102 in a second direction (from a second end of the underbody converter proximal to the tailpipe to the first end of the underbody converter proximal to the engine exhaust manifold). Herein, the second direction is opposite to the first direction of exhaust flow. After exiting the underbody converter 118, the exhaust continues to flow via the second branch 402 towards the junction 405. At the junction 405, the exhaust may then enter the first inlet pipe 423. From the first inlet pipe 423, the exhaust may enter the first branch 404. Due to the first position of the first three-way valve 119, the exhaust may not continue to flow downstream via the first branch 104, and may be routed to enter the first exhaust passage 222. Due to the first position of the second three-way valve 220, the exhaust from the first exhaust passage 222 may circulate through the exhaust channels 229, and then return to the first branch 204 via the second exhaust passage 226. During exhaust flow through the exhaust channels 229, a coolant may be circulated via the coolant line 224, and the coolant circuit surrounding the cylinders to extract heat from the exhaust.

After returning to the first branch 204, the exhaust may then flow through the turbine 116 housed in the first branch 104 of the exhaust assembly 400 in the first direction (from a first end of the turbine proximal to the engine exhaust manifold to the second end of the turbine proximal to the tailpipe). After exiting the turbine 116, the exhaust may continue to flow downstream via the first branch 104 into the first outlet pipe 424. Upon reaching the junction 407 (via the first outlet pipe 424), the exhaust may exit the branched exhaust assembly 400 and may continue to flow downstream towards the tailpipe via the main exhaust passage 403.

The branched exhaust assembly may be operated in the first operating mode (as described above) during cold-start conditions. By adjusting exhaust flow to route hot exhaust first through the TWC 120, before flowing the exhaust through the remaining exhaust components (turbine 116 and underbody converter 118), exhaust heat may be effectively transferred to the catalyst, expediting catalyst activation. Therefore, hot exhaust may be effectively used for increasing TWC temperature reducing the need for spark retard, thereby increasing fuel efficiency of the engine. By attaining the TWC 120 light-off temperature faster, emissions quality may be improved. By flowing the exhaust through exhaust channels 229, heat from the exhaust may be recovered and used for heating cylinder walls, and pistons, which may reduce cold-start hydrocarbon emissions. Also, by routing the exhaust through the turbine 116, during cold-start conditions, any delays in turbine spin-up may be reduced thereby reducing turbo-lag and enhancing boost performance.

Figure 4B:
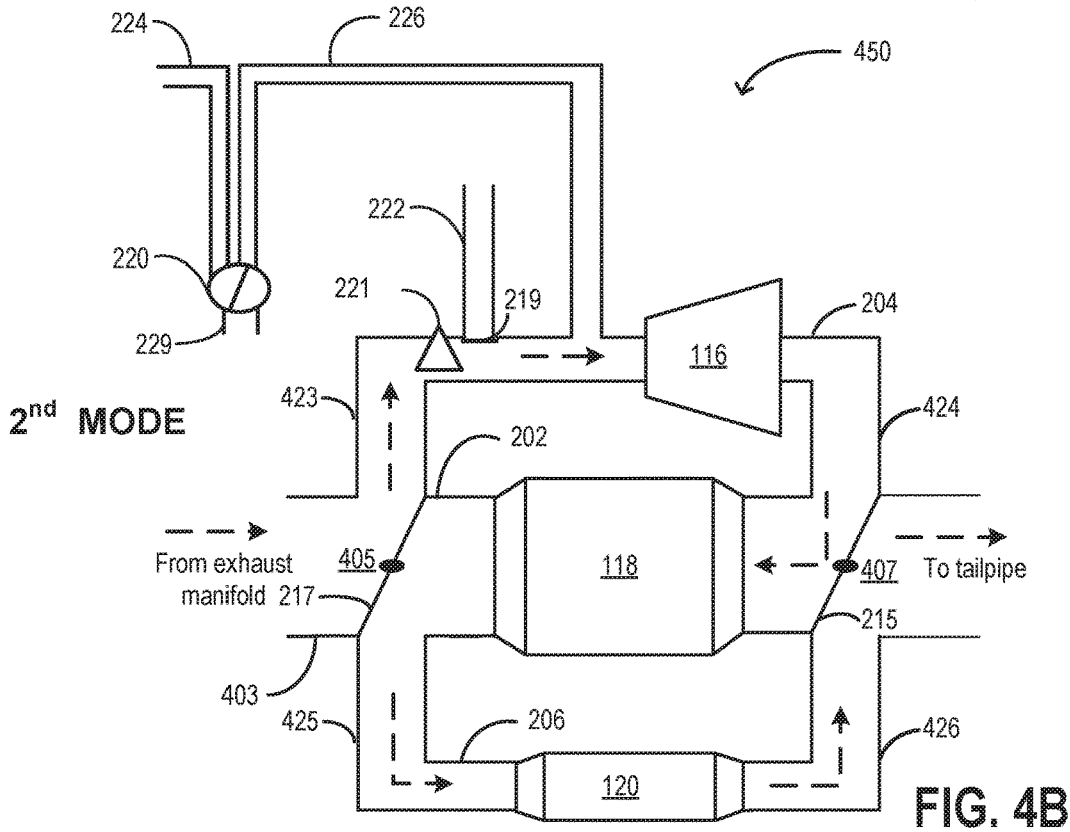
FIG. 4B shows an example embodiment of the second branched exhaust assembly of FIG. 2 operating in a second mode.

FIG. 4B shows a schematic view 450 of an example embodiment of an exhaust bypass assembly 400 in a second operating mode. Components previously introduced in FIG. 4A are numbered similarly and not reintroduced.

The second operating mode represents a second setting of the four-way valves 417 and 415, and the three-way valves 419 and 420 that enables exhaust flow control. In the second operating mode, the first four-way valve 217 may be in a second position, the second four-way valve 215 may be in a second position, the first three-way valve 219 may be in a second position, and the second three-way valve 220 may also be in a second position. When in the second operating mode, due to the second position of the first valve 217, the entire volume of exhaust flowing downstream via the main exhaust passage 403 may enter the first inlet pipe 423 at junction 405. Due to the second position of the three-way valve 219, the entrance to the first exhaust passage 222 may be blocked, and exhaust may not enter the first exhaust passage 222. Therefore, from the first inlet pipe 423, the exhaust may continue to flow through the turbine 116 housed in the first branch 204 of the exhaust assembly 400, in a first direction (from a first end of the turbine proximal to the engine exhaust manifold to the second end of the turbine proximal to the tailpipe). After exiting the turbine 116, the exhaust continues to flow downstream via the first branch 204 onto the first outlet pipe 424. Due to the second position of the second valve 215, upon reaching the junction 407, the exhaust may be routed through the underbody converter 118 housed in the second branch 202 in a second direction (from a second end of the underbody converter proximal to the tailpipe to the first end of the underbody converter proximal to the engine exhaust manifold). After exiting the underbody converter 118, the exhaust continues to flow via the second branch 202 towards the junction 405. At the junction 405, the exhaust may then enter the second inlet pipe 425. From the second inlet pipe 425, the exhaust may flow through the three-way catalyst (TWC) 120 housed in the third branch 206 of the exhaust assembly 400, in a first direction (from a first end of the TWC proximal to the engine exhaust manifold to the second end of the TWC proximal to the tailpipe). After exiting the TWC 120, the exhaust may continue to flow downstream via the third branch 206 onto the second outlet pipe 426. Upon reaching the junction 407 (via the second outlet pipe 426), the exhaust may exit the branched exhaust assembly 400 and may continue to flow downstream towards the tailpipe via the main exhaust passage 403.

The branched exhaust assembly may be operated in the second operating mode (as described above) once the TWC 120 is fully activated (after attainment of light-off temperature), and exhaust heat recovery may no longer be desired to increase the engine temperature. During this time, the engine load may be low/moderate and engine temperature may be higher. By adjusting exhaust flow to route hot exhaust first through the turbine 116, boost performance may be enhanced in the low-medium load region. Once the exhaust passes through the turbine 116, the temperature of the exhaust may drop. Owing to a coating on the catalyst surface, the TWC 120 may have a higher conversion efficiency at lower exhaust temperatures. As a result, the low temperature exhaust reaching the TWC 120 (after passing through turbine 216) may result in an optimal performance of the TWC 120.

Figure 4C:
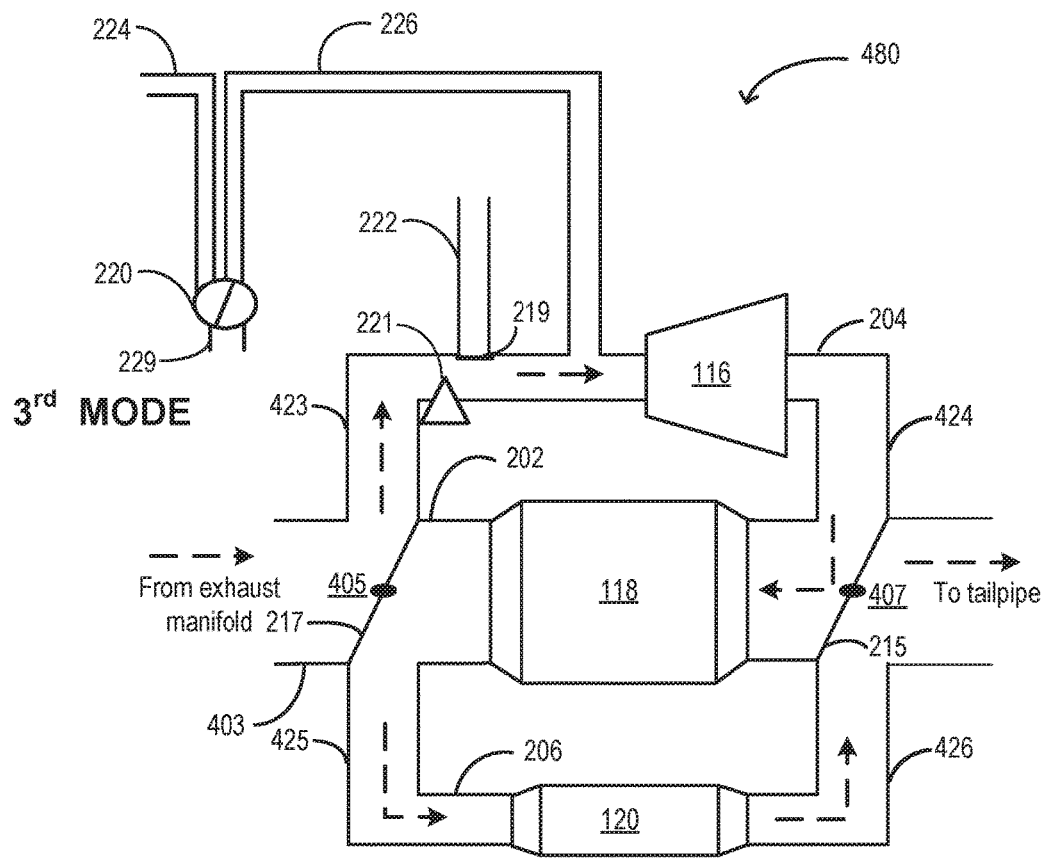
FIG. 4C shows an example embodiment of the second branched exhaust assembly of FIG. 2 operating in a third mode.

FIG. 4C shows a schematic view 480 of an example embodiment of the exhaust bypass assembly 400 in a third operating mode. The third operating mode represents a third setting of the four-way valves 117 and 115, and the three-way valves 419 and 420 that enables exhaust flow control. In the third operating mode, the first four-way valve 217 may be in a second position, the second four-way valve 215 may be in a second position, the first three-way valve 219 may be in a second position, and the second three-way valve 220 may also be in a second position. When in the third operating mode, due to the second position of the first valve 217, the entire volume of exhaust flowing downstream via the main exhaust passage 403 may enter the first inlet pipe 423 at junction 405. Due to the second position of the three-way valve 219, the entrance to the first exhaust passage 222 may be blocked, and exhaust may not enter the first exhaust passage 222. Upstream of the turbine a cooling fluid may be injected to thee exhaust flow via the injector 221. In one example, the cooling fluid may be cold water. The cooling fluid may decrease the temperature of the exhaust entering the turbine. The cooler exhaust may continue to flow through the turbine 116 housed in the first branch 204 of the exhaust assembly 400, in a first direction (from a first end of the turbine proximal to the engine exhaust manifold to the second end of the turbine proximal to the tailpipe). After exiting the turbine 116, the exhaust continues to flow downstream via the first branch 204 onto the first outlet pipe 424. Due to the second position of the second valve 215, upon reaching the junction 407, the exhaust may be routed through the underbody converter 118 housed in the second branch 202 in a second direction (from a second end of the underbody converter proximal to the tailpipe to the first end of the underbody converter proximal to the engine exhaust manifold). After exiting the underbody converter 118, the exhaust continues to flow via the second branch 202 towards the junction 405. At the junction 405, the exhaust may then enter the second inlet pipe 425. From the second inlet pipe 425, the exhaust may flow through the three-way catalyst (TWC) 120 housed in the third branch 206 of the exhaust assembly 400, in a first direction (from a first end of the TWC proximal to the engine exhaust manifold to the second end of the TWC proximal to the tailpipe). After exiting the TWC 120, the exhaust may continue to flow downstream via the third branch 206 onto the second outlet pipe 426. Upon reaching the junction 407 (via the second outlet pipe 426), the exhaust may exit the branched exhaust assembly 400 and may continue to flow downstream towards the tailpipe via the main exhaust passage 403.

The branched exhaust assembly may be operated in the third operating mode (as described above) during conditions of high engine load. Under such circumstances, by cooling the exhaust entering the turbine, the thermal load on the turbine may be reduced, which in turn may reduce the turbine speed and possibility of hardware damage to the turbine components. In this way, based on engine operating conditions and temperature requirements of each component, exhaust may be routed through all three components in the branched exhaust system 400.

In the example modes shown in FIGS. 4A-4C, transitioning from the first to the second mode may take place responsive to activation of the three-way catalyst 118, transitioning from the second mode to the third mode may take place responsive to an increase in demanded torque (e.g., higher than threshold engine load), and transitioning from the third mode to the first mode may be carried out responsive to an engine shutdown request.

The three example modes of operation of the branched exhaust assembly of FIG. 2 as discussed above are tabulated in FIG. 9. Line 902 of table 900 shows operation of the branched exhaust assembly in the first mode as described in FIG. 4A, line 904 shows operation of the branched exhaust assembly in the second mode as described in FIG. 4B, and line 906 shows operation of the branched exhaust assembly in the third mode as described in FIG. 4C.

In this way, the system of FIGS. 1, 2, 3A-3C, and FIGS. 4A-4C provide for engine system, comprising: an engine including an exhaust manifold, a pedal position sensor, a branched exhaust assembly with a first branch, a second branch, a third branch, a bypass passage, a first valve, a second valve, and a third valve, a turbocharger with a turbine coupled to the first branch of the branched exhaust assembly, the turbine connected to a compressor, an underbody converter coupled to the second branch of the exhaust assembly, a three-way catalyst coupled to the third branch of the exhaust assembly, a heat exchanger coupled to the bypass passage, the heat exchanger fluidically coupled to an engine coolant system, an engine coolant temperature sensor coupled to the engine coolant system, and a controller with computer readable instructions stored on non-transitory memory for: estimating an engine temperature, and engine load via the one or more of the engine coolant temperature sensor and the pedal position sensor, selecting an order of flowing exhaust through each of the turbine, the underbody converter, and the three-way catalyst as a function of the estimated engine temperature and engine load, and actuating each of the first valve, the second valve, and the third valve to flow exhaust through each of the turbine, the underbody converter, and the three-way catalyst via each of the first branch, the second branch, and the third branch according to the selected order of exhaust flow.

Figure 5:
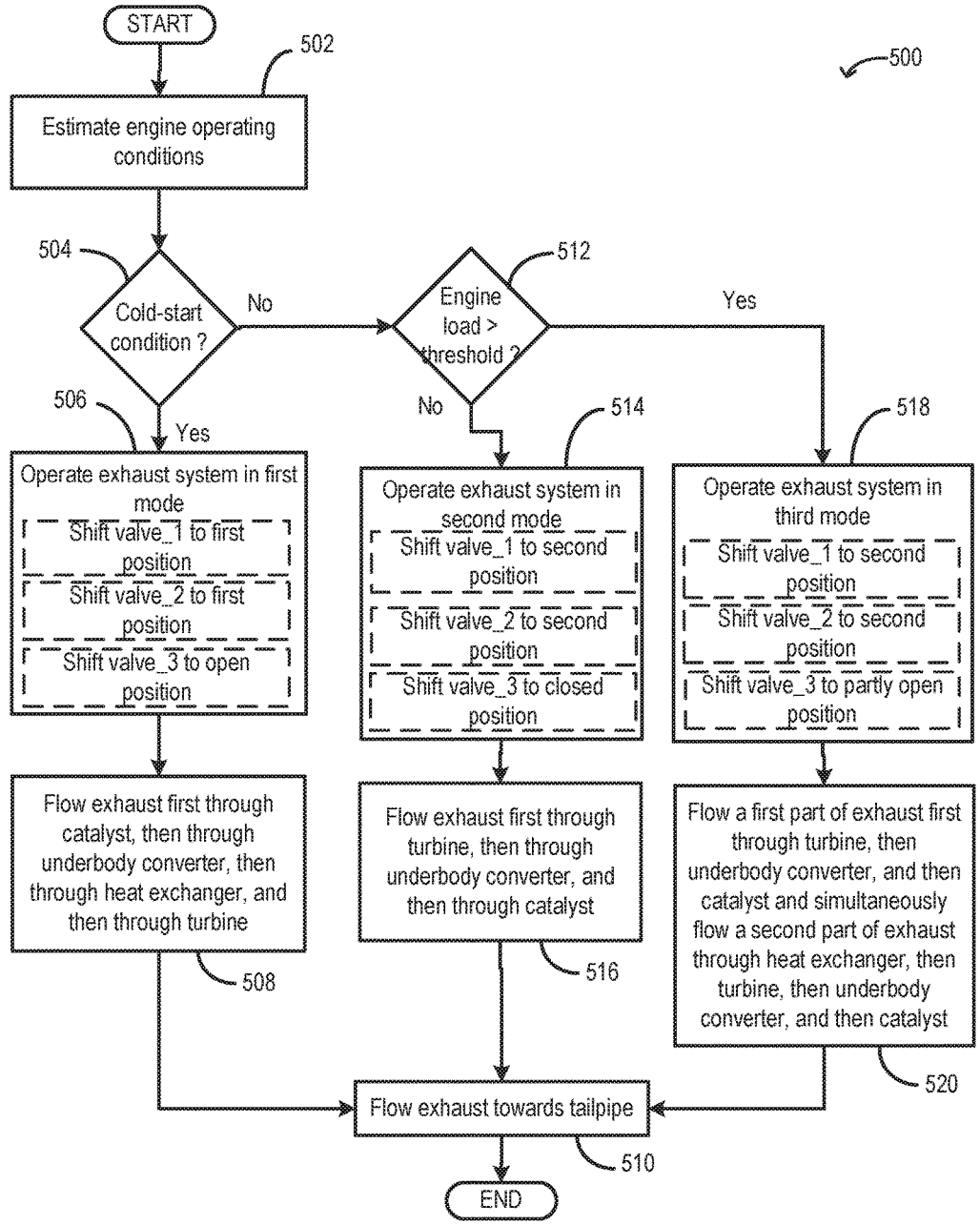
FIG. 5 shows a flow chart illustrating an example method that may be implemented for adjusting exhaust flow through the first branched exhaust assembly, and the heat exchanger.

FIG. 5 illustrates an example method 500 that may be implemented for adjusting exhaust flow via different flow-paths of a branched exhaust assembly, such as the assembly of FIG. 1 and FIGS. 3A-3C. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, the routine includes estimating and/or measuring current engine operating conditions. Conditions assessed may include, for example, engine temperature, engine load, engine speed, manifold vacuum, throttle position, exhaust pressure, exhaust air/fuel ratio, etc.

At 504, the routine includes determining if the vehicle engine is operating under cold-start conditions. An engine cold-start condition may be confirmed when the engine is started after a prolonged period of engine inactivity, and when the engine temperature is lower than a threshold. The threshold may be based on a light-off temperature of a three-way catalyst housed in a branch of the exhaust assembly (such as the exhaust assembly 300 in FIG. 3A). Prior to attainment of light-off temperature, the catalyst may not function efficiently, thereby increasing emissions during this time. Cold-start conditions may also be inferred from a lower than threshold ambient temperature.

During cold-start conditions, in order to expedite attainment of catalyst light-off temperature, hot exhaust may first be routed through the catalyst instead of flowing it via the turbine which may act as a heat sink (reducing temperature of catalyst reaching catalyst), and also at this time, heating of engine cylinders, and piston may be desired. Thus, if engine cold-start conditions are confirmed, the routine moves to 506 in order to operate the exhaust assembly in a first operating mode. Operating in the first mode, as described in relation to FIG. 3A, includes shifting the first four-way valve or valve_1 (such as valve 117 in FIG. 3A) located in the exhaust passage upstream of the exhaust assembly to a first position, and shifting the second four-way valve or valve_2 (such as valve 115 in FIG. 3A) located in the exhaust passage downstream of the exhaust assembly to a first position. Also the diverter valve or valve_3 (such as valve 119 in FIG. 3A) coupled to the first branch at the junction with the bypass passage may be actuated to a completely open position.

At 508, by setting the exhaust assembly to the first operating mode, the entire volume of exhaust flowing downstream via the main exhaust passage may enter an inlet (second) pipe (such as the second inlet pipe 325 in FIG. 3A) and continue to flow through a three-way catalyst (TWC) (such as the three-way catalyst 120 in FIG. 3A) housed in a third branch (such as the third branch 106 in FIG. 3A) of the exhaust assembly. At the TWC, heat from the exhaust may be utilized to increase the temperature of the TWC. By expediting attainment of TWC light-off temperature, quality of emissions may be improved. After exiting the TWC, the exhaust may continue to flow downstream via the third branch onto an outlet (second) pipe (such as the second outlet pipe 326 in FIG. 3A). From thereon, the exhaust may be routed through an underbody converter (such as the underbody converter 118 in FIG. 3A) housed in a second branch (such as the second branch 102 in FIG. 3A) of the exhaust assembly. After exiting the underbody converter, the exhaust may flow through a heat exchanger (such as the heat exchanger 122 in FIG. 3A) housed in the bypass passage (such as the bypass passage 123 in FIG. 3A) and then flow through a turbine (such as the turbine 116 in FIG. 3A) housed in a first branch (such as the first branch 104 in FIG. 3A) of the exhaust assembly, via an inlet (first) pipe (such as the first inlet pipe 323 in FIG. 3A). By flowing exhaust through the turbine, boost may be provided to the engine even during cold-start conditions. After exiting the turbine, the exhaust may continue to flow downstream via the first branch onto the outlet (first) pipe (such as the first outlet pipe 324 in FIG. 3A) and from thereon may exit the exhaust assembly.

By adjusting exhaust flow to route hot exhaust first through the TWC, before flowing the exhaust through the remaining exhaust components (turbine and underbody converter), exhaust heat may be effectively transferred to the catalyst, expediting catalyst activation. In this way, hot exhaust may be effectively used for increasing TWC temperature without the requirement of spark retard, thereby increasing fuel efficiency of the engine. By flowing exhaust through the heat exchanger, heat from the exhaust may be recovered by a coolant circulating through the heat exchanger, and the recovered exhaust heat may be used to heat cylinder walls and pistons. By increasing the temperature of the cylinder walls and pistons, hydrocarbon emissions from the engine may be reduced. Also, by routing the exhaust through the turbine, any delay in turbine spin-up may be reduced thereby reducing turbo-lag and enhancing boost performance. After exiting the exhaust assembly, at 510, the exhaust may flow towards the tailpipe. After passing through a muffler, the exhaust may be released to the atmosphere.

If it is determined (at 504) that the engine is not operating under cold-start conditions, it may be inferred that warm enough where the catalyst has reached the light-off temperature and is functioning effectively for emissions control. At 512, the routine includes determining if the engine load is higher than a threshold load. The threshold load may correspond to a peak engine load beyond which there may be possibility of turbine component damage due to increased volume of hot exhaust flowing through the turbine.

If engine load is lower than the threshold load, the routine moves to 514 in order to operate the exhaust assembly in a second operating mode. Operating in the second mode, as described in relation to FIG. 3B, includes shifting the first four-way valve (valve_1) to a second position, shifting the second four-way valve (valve_2) to a second position, and actuating the diverter valve (valve_3) also to a fully closed position.

At 516, by setting the exhaust assembly to the second operating mode, the entire volume of exhaust flowing downstream via the main exhaust passage may enter the first inlet pipe and continue to flow through the turbine housed in the first branch of the exhaust assembly. By flowing hot exhaust through the turbine, desired boost may be provided to the engine. Also, as the exhaust flows through the turbine, the temperature of the exhaust decreases. After exiting the turbine, the exhaust continues to flow downstream via the first branch onto the first outlet pipe. From thereon, the exhaust may be routed through the underbody converter housed in the second branch. After exiting the underbody converter, the exhaust may continue to flow towards the TWC housed in the third branch, via second inlet pipe. The temperature of exhaust passing though the TWC is lower compared to the temperature of exhaust entering the turbine in this mode, thereby facilitating optimal performance of the TWC. After exiting the TWC, the exhaust may exit the branched exhaust assembly via the second outlet pipe.

By adjusting exhaust flow to route hot exhaust first through the turbine, boost performance may be enhanced, and also the temperature of the exhaust may be reduced. Owing to the coating on the catalyst surface, the low temperature exhaust may facilitate a higher conversion efficiency of the TWC. After exiting the exhaust assembly (operated in second mode), at 522, the exhaust may flow towards the tailpipe. After passing through a muffler, the exhaust may be released to the atmosphere.

If it is determined (at 512) that the engine is load is higher than the threshold load, the routine moves to 518 in order to operate the exhaust assembly in the third operating mode. Operating in the third mode, as described in relation to FIG. 3C, includes maintaining the first four-way valve (valve_1) and the second four-way valve (valve_2) in the second position, and adjusting the opening of the diverter valve to vary the ratio of hot exhaust relative to cool exhaust that is flowed through the turbine. Adjusting the opening of the diverter valve includes shifting the diverter valve (valve_3) to a partially open position. In one example, the valve_3 may be a continuously adjustable valve and in the third position, the degree of opening of valve_3 may be adjusted based on a target fraction of exhaust to be diverted via the heat exchanger before flowing through the turbine, the target fraction determined based on current boost pressure relative to desired boost pressure (that is boost error), the desired boost pressure based on engine speed and load, and driver demanded torque.

At 520, by setting the exhaust assembly to the third operating mode, the entire volume of exhaust flowing downstream via the main exhaust passage may enter the first branch via the first inlet pipe. A first portion of the exhaust may enter the bypass passage, and flow through the heat exchanger wherein heat from the exhaust may be transferred to a coolant circulating through the heat exchanger. After exiting the heat exchanger, the exhaust may reenter the first branch upstream of the turbine, and then flow through the turbine. A second (remaining) portion of the exhaust may directly flow through the turbine. The first and the second portions of the exhaust may combine upstream of the turbine, and flow downstream via the first branch onto the first outlet pipe. From thereon, the exhaust may be routed through the underbody converter housed in the second branch. After exiting the underbody converter, the exhaust may continue to flow towards the TWC housed in the third branch, via second inlet pipe. The temperature of exhaust passing though the TWC may be lower, thereby facilitating optimal performance of the TWC. After exiting the TWC, the exhaust may exit the branched exhaust assembly via the second outlet pipe. By routing exhaust via multiple flow paths in the exhaust assembly, it is possible to lower the temperature of exhaust flowing through the turbine thereby reducing the possibility of boost error, and turbine hardware malfunction during high engine load conditions.

The fraction of exhaust routed via the heat exchanger to be cooled before entry into the turbine, relative to the fraction of exhaust routed directly into the turbine without passing through the heat exchanger may be determined based on engine operating conditions and boost demand. That is, the ratio of the first portion of the exhaust to the second portion may be based on parameters such as driver demanded torque and boost error. In one example, as the driver demand increases, the degree of opening of the diverter valve may be decreased. By decreasing the opening of valve_3, the first portion of cooled exhaust delivered to the turbine may be decreased in relation to the second portion of hot exhaust delivered to the turbine, thereby improving turbine spin-up times and time to torque. During lower driver demand conditions, a degree of opening of the diverter valve (valve_3) may be increased to route a larger volume of cooled exhaust into the turbine via the heat exchanger. This allows for a faster decrease in turbine speed and boost output and reduces the need for excessive wastegating. In one example, by varying the ratio of cooled to hot exhaust, the need for a wastegate valve in the engine system is reduced, providing component reduction benefits in terms of cost and control complexity. As another example, during conditions when there is a boost error due to the desired boost being lower than the actual boost (e.g., during a tip-out), the first portion of cooled exhaust through the turbine may be increased by increasing the opening of the diverter valve to rapidly reduce the boost error and avert compressor surge.

After exiting the exhaust assembly (operated in third mode), at 522, each of the first and the second portion of the exhaust may be combined upstream of the turbine, and the combined flow may be directed towards the tailpipe after passage through the turbine. After passing through a muffler in the tailpipe, the entire volume of exhaust may be released to the atmosphere.

In this way, each of the first four-way valve, the second four-way valve, and the diverter valve may be adjusted to flow exhaust through each of the turbine, the underbody converter, and the three-way catalyst via each of the first branch, the second branch, and the third branch, wherein an order of flowing exhaust is based on engine temperature and engine load.

Figure 7:
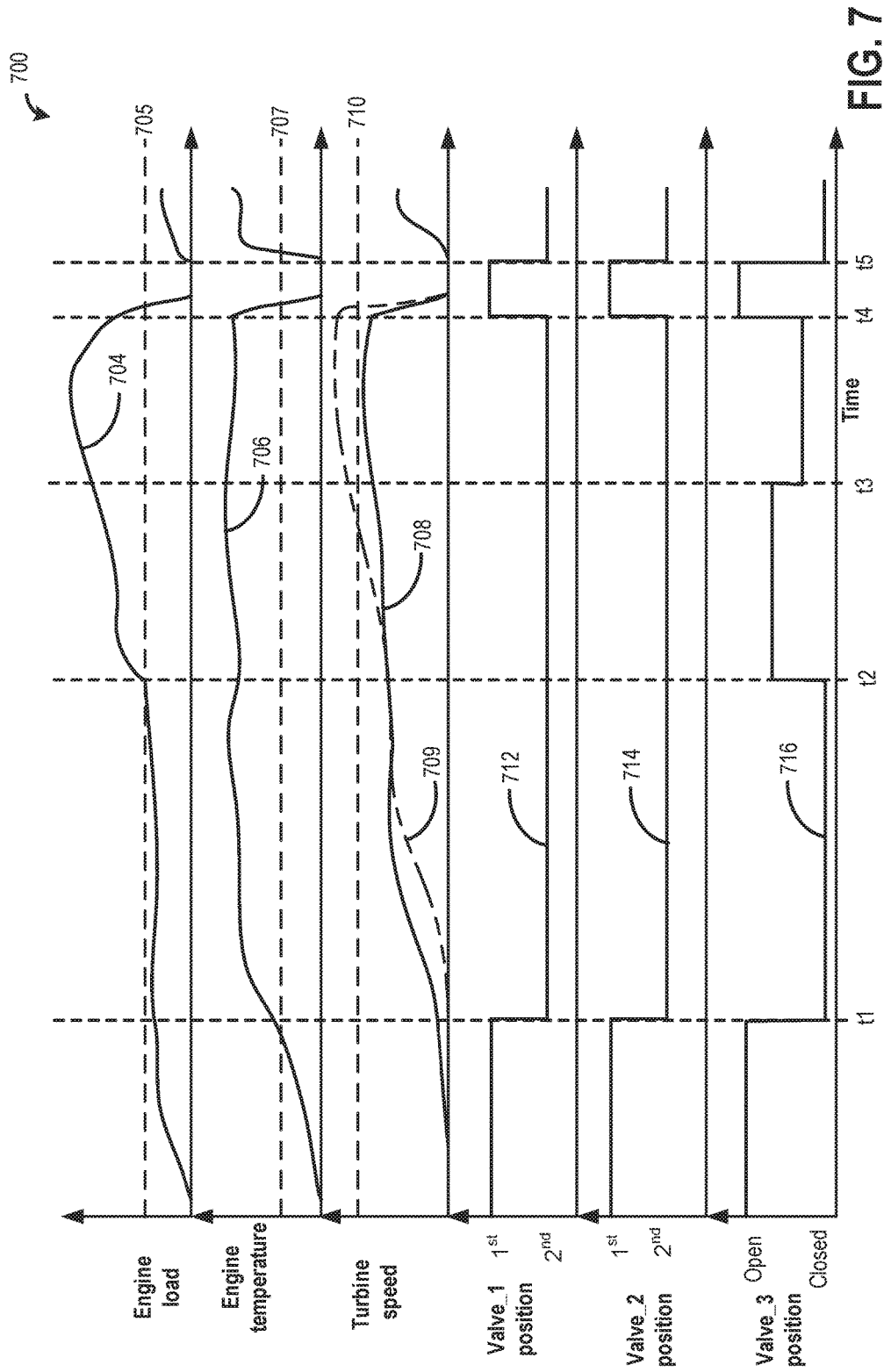
FIG. 7 shows an example operation of the first branched exhaust assembly.

FIG. 7 shows an example operating sequence 700 illustrating operation of the branched exhaust assembly of FIG. 1. The direction of exhaust flow through the different flow-paths with different components is determined based on engine operating conditions and temperature requirement of each component. The horizontal (x-axis) denotes time and the vertical markers t1-t5 identify significant times in the operation of the exhaust bypass assembly system.

The first plot, line 704, shows variation in engine load as estimated via a pedal position sensor, relative to a threshold load (as shown by dotted line 705). The second plot, line 706, shows change in engine temperature as estimated via an engine coolant temperature sensor, relative to a threshold temperature (as shown by dotted line 707). The third plot, line 708, shows variation in turbine speed over time. Dotted line 709 shows turbine speed when exhaust flow through the turbine is not regulated via the branched exhaust assembly. Dotted line 710 denotes a threshold turbine speed above which turbine hardware may be affected. The fourth plot, line 712, shows a position of a first four-way valve (valve_1) coupled to the exhaust passage upstream of the branched exhaust assembly. The fifth plot, line 714, shows a position of a second four-way valve (valve_2) coupled to the exhaust passage downstream of the branched exhaust assembly. The sixth plot, line 716, shows an opening of a continuously variable diverter valve (valve_3) coupled to the first branch of the branched system at a junction with a bypass passage.

Prior to time t1, the engine starts from rest after a period of inactivity during which the vehicle was not propelled. The engine may start under cold-start conditions due to the engine temperature being lower than threshold temperature 707. During this time, the engine may be operated with a lower than threshold engine load (below the threshold load 705). Below the threshold temperature, the engine may not be warm enough for TWC activation. Due to the cold-start conditions, the TWC (such as the TWC 120 in FIG. 1) coupled to the third branch of the exhaust assembly may not have attained its light-off temperature. In order to expedite catalyst warming, the controller may actuate each of the first valve (valve_1) and the second valve (valve_2) to their respective first positions to route hot exhaust first through the TWC. As a result of the selected valve setting, the entire volume of hot exhaust may first flow through the TWC, wherein heat from the exhaust may be utilized to increase the TWC temperature. After exiting the TWC, the exhaust may flow through the underbody converter (such as the underbody converter 118 in FIG. 1) coupled to the second branch of the exhaust assembly. In addition, the diverter valve (valve_3) may be actuated to a completely open position to route the entire amount of exhaust via a heat exchanger coupled to the bypass passage before flowing through the turbine. Heat from the exhaust may be transferred to a coolant circulating through the heat exchanger. The heated coolant is circulated through the engine block, including around the cylinder walls and pistons with a corresponding increase in the engine temperature. After flowing through the heat exchanger, the exhaust may flow through the turbine (such as the turbine 116 in FIG. 1). As a result, the turbine may start to spool-up and the turbine speed gradually increases.

At time t1, the engine temperature may exceed the threshold temperature (707), indicating that the TWC has attained the light-off temperature and is activated. At this time, further engine heating may not be desired. In order to route lower temperature exhaust through the TWC (for improved conversion efficiencies at the TWC) while providing a desired boost, each of the first valve (valve_1), and the second valve (valve_2) may be shifted to their respective second positions. The diverter valve (valve_3) may be actuated to a completely closed position. Between time t1 and t2, due to the given valve settings, the entire volume of hot exhaust may first flow through the turbine (not passing through the heat exchanger), wherein the exhaust may be utilized to further spin the turbine and meet the boost demand. If the exhaust was not routed through the turbine during the cold-start condition, the turbine would not have spun-up prior to t1 (as shown by plot 709) and the time to reach the desired turbine speed (corresponding to desired boost) have been higher. As such, by initiating turbine spin-up prior to time t1, the time to torque may be reduced. The exhaust temperature reaching the TWC may be lower due to the exhaust reaching the TWC after flowing through the turbine. Consequently, optimal performance of the TWC may be facilitated. Also, by adjusting the exhaust flow to route the hot exhaust through the turbine before flowing the exhaust through the remaining exhaust components, turbo lag may be reduced.

At time t2, there is an increase in engine load to above the threshold load due to an increase in driver demand. Due to the higher load conditions, between time t2 and t3, the temperature and volume of exhaust may increase substantially and the entire volume of hot exhaust may not be routed through the turbine in order to reduce boost error and avoid damage to the turbocharger components. Therefore, during this time, in order to simultaneously route exhaust via two flow-paths, the opening of the diverter valve (valve_3) may be adjusted to divert a first portion of the exhaust from the first branch into the bypass passage and through the heat exchanger in order to reduce the temperature of the first portion of exhaust. Simultaneously, a second (remaining) portion of the exhaust may directly flow through the turbine. After passage through the heat exchanger, the first portion is then returned to the first branch and mixed with the second portion of hot exhaust in the first branch before flowing the mixture through the turbine. Due to the reduced temperature of the first portion of exhaust entering the turbine, the temperature of the exhaust mixture reaching the turbine is lowered. This enables the speed of the turbine to be reduced and maintained below the threshold speed while delivering the desired boost pressure. The ratio of the first portion of the exhaust to the second portion may be based on parameters such as driver demand and boost error. The degree of opening of valve_3 may be adjusted based on the estimated ratio. Thus, as the driver demand falls, and the boost pressure increases (with actual boost higher than desired boost), the ratio of the first portion of cooled exhaust to the second portion of hot exhaust delivered to the turbine may be increased. The first and the second portions of the exhaust may combine at the first branch upstream of the turbine, and then flow through the turbine. After exiting the turbine, the exhaust may flow through the underbody converter and then through the TWC. Due to the lower temperature of the exhaust reaching the TWC after passage through the turbine (where work is extracted from exhaust heat), optimal performance of the TWC may be facilitated.

At time t3, there may be a further increase in engine load due to an increase in driver demand. In response to the higher driver demand, the speed of the turbine may be increased to provide the desired boost. In order to increase the turbine speed, the second portion of hot exhaust delivered directly to the turbine may be increased and correspondingly the first portion of exhaust cooled by the heat exchanger prior to entering the turbine may be decreased. The first portion of exhaust flowing through the heat exchanger, may be decreased by decreasing the opening of valve_3. Between time t3 and t4, due to the decreased flow of exhaust through the heat exchanger, there may be an increase in the exhaust temperature reaching the turbine which in turn may increase the turbine speed. However, the updated turbine speed may be continued to be maintained below the threshold. As an example, between time t2 and t4, if a portion of the exhaust was not cooled before entering the turbine, as shown by line 709, the turbine speed may have increased to above the threshold level, thereby increasing possibility of turbine hardware damage.

In this way, during high load conditions, by simultaneously flowing exhaust via two flow-paths of the exhaust assembly, a portion of the exhaust may be cooled before entering the turbine, thereby reducing possibility of turbine hardware damage.

At time t4, an engine shutdown request is received, responsive to which engine fueling is discontinued, and the engine is spun down to rest. Owing to this, engine speed and engine load may reduce. Responsive to the engine shutdown request, each of the valve_1 and valve_2 may be actuated to their respective first positions, and valve_3 may be completely opened. The first positions of each of valve_1 and valve_2 and the fully open position of valve_3 may be the default setting of the valves during an engine shut-down. Between time t4 and t5, the engine continues to be shut down and engine temperature is not measured.

At time t5, an engine restart request is received responsive to which the engine starts from rest. Herein the engine is restarted after a shorter duration while the engine temperature is above the threshold temperature 707. Therefore, the engine may start under hot-start conditions. Due to the higher engine temperature at the restart, valve_1 and valve_2 may be actuated to their respective second positions, and valve_3 may be fully closed. Due to the given valve settings, the entire volume of hot exhaust may first flow through the turbine, and there may be a resulting decrease in the exhaust temperature reaching the downstream exhaust components. After exiting the turbine, the lower temperature exhaust may flow through the underbody converter and then through the TWC, improving TWC performance. After time t5, the exhaust assembly may continue to operate in this mode.

In this way, by adjusting a position of a plurality of valves coupled to a branched exhaust system having a first, a second and a third branch, each branch housing a distinct exhaust component, an order of exhaust flow through the distinct exhaust component may be varied while flowing exhaust through each of the distinct exhaust components.

Figure 8:
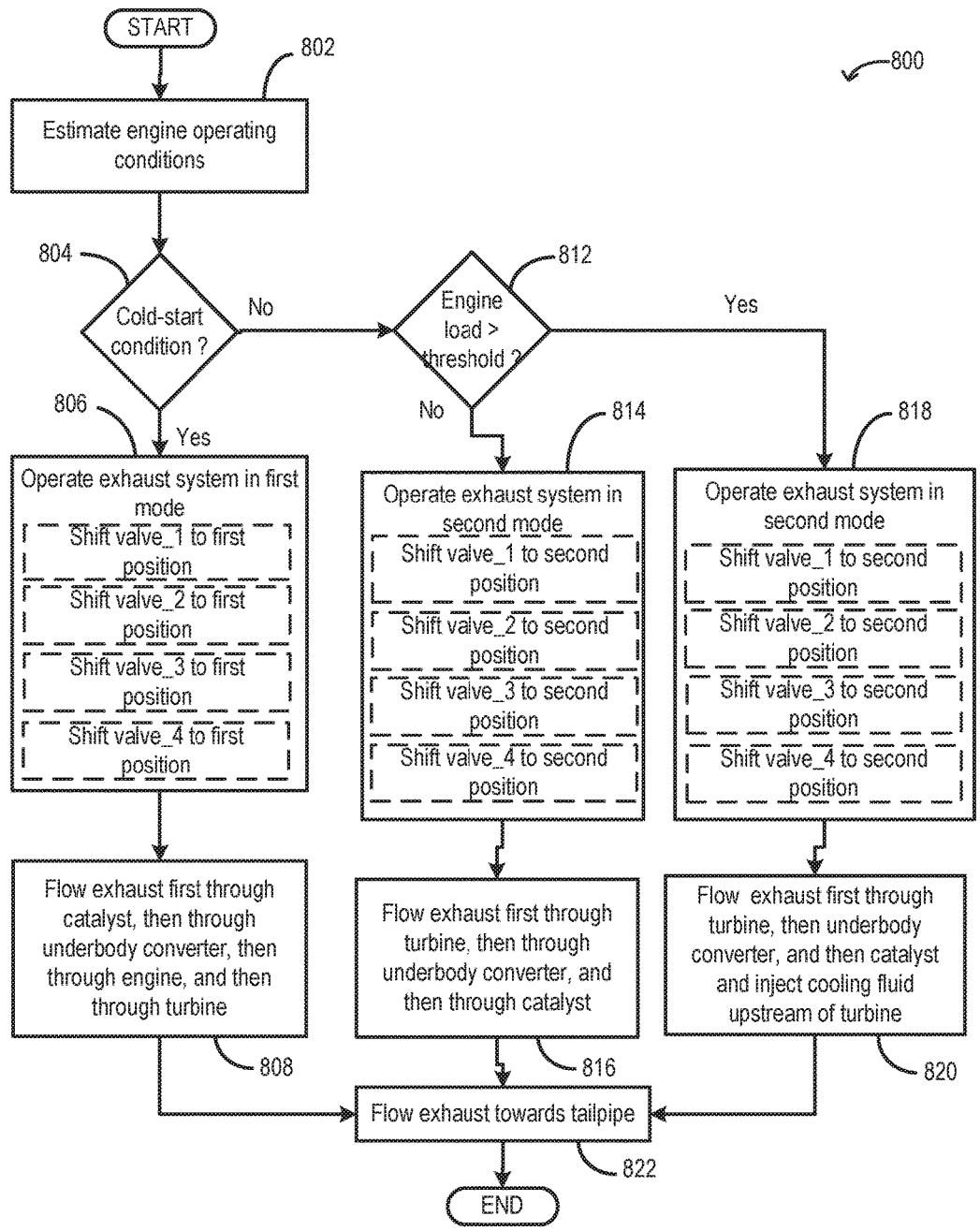
FIG. 8 shows a flow chart illustrating an example method that may be implemented for adjusting exhaust flow through the second branched exhaust assembly, and the exhaust heat recovery system.

FIG. 8 illustrates an example method 800 that may be implemented for adjusting exhaust flow via different flow-paths of a branched exhaust assembly, such as the assembly of FIG. 2 and FIGS. 4A-4C.

At 802, the routine includes estimating and/or measuring current engine operating conditions. Conditions assessed may include, for example, engine temperature, engine load, engine speed, manifold vacuum, throttle position, exhaust pressure, exhaust air/fuel ratio, etc.

At 804, the routine includes determining if the vehicle engine is operating under cold-start conditions. An engine cold-start condition may be confirmed when the engine is started after a prolonged period of engine inactivity, and when the engine temperature is lower than a threshold. The threshold may be based on a light-off temperature of a three-way catalyst housed in a branch of the exhaust assembly (such as the exhaust assembly 400 in FIG. 4A). Prior to attainment of light-off temperature, the catalyst may not function efficiently, thereby increasing emissions during this time. Cold-start conditions may also be inferred from a lower than threshold ambient temperature.

During cold-start conditions, in order to expedite attainment of catalyst light-off temperature, hot exhaust may first be routed through the catalyst instead of flowing it via the turbine which may act as a heat sink (reducing temperature of catalyst reaching catalyst), and also at this time, heating of engine cylinders, and piston may be desired. Thus, if engine cold-start conditions are confirmed, the routine moves to 806 in order to operate the exhaust assembly in a first operating mode. Operating in the first mode, as described in relation to FIG. 4A, includes shifting the first four-way valve or valve_1 (such as valve 217 in FIG. 4A) located in the exhaust passage upstream of the exhaust assembly to a first position, shifting the second four-way valve or valve_2 (such as valve 215 in FIG. 4A) located in the exhaust passage downstream of the exhaust assembly to a first position. Also, the first three-way valve or valve_3 (such as valve 219 in FIG. 4A) coupled to the first branch at the junction with a first exhaust passage and the second three-way valve or valve_4 (such as valve 220 in FIG. 4A) located at a junction of exhaust channels, and a second exhaust passage (such as second exhaust passage 226 in FIG. 4A) may be shifted to their respective first positions.

At 808, by setting the exhaust assembly to the first operating mode, the entire volume of exhaust flowing downstream via the main exhaust passage may enter an inlet (second) pipe (such as the second inlet pipe 425 in FIG. 4A) and continue to flow through a three-way catalyst (TWC) (such as the three-way catalyst 120 in FIG. 4A) housed in a third branch (such as the third branch 206 in FIG. 4A) of the exhaust assembly. At the TWC, heat from the exhaust may be utilized to increase the temperature of the TWC. By expediting attainment of TWC light-off temperature, quality of emissions may be improved. After exiting the TWC, the exhaust may continue to flow downstream via the third branch onto an outlet (second) pipe (such as the second outlet pipe 426 in FIG. 4A). From thereon, the exhaust may be routed through an underbody converter (such as the underbody converter 118 in FIG. 4A) housed in a second branch (such as the second branch 202 in FIG. 4A) of the exhaust assembly. After exiting the underbody converter, the exhaust flow may enter the first branch (such as the first branch 204 in FIG. 4A) of the exhaust assembly via an inlet (first) pipe (such as the first inlet pipe 423 in FIG. 4A) and then flow through an exhaust channel (such as the exhaust channel in FIG. 4A) around the engine cylinders where heat from the exhaust may be transferred to a coolant circulating the cylinders through a coolant channel. After flowing through the engine (via exhaust channels) the exhaust may then flow through a turbine (such as the turbine 116 in FIG. 3A) housed in the first branch. By flowing exhaust through the turbine, boost may be provided to the engine even during cold-start conditions. After exiting the turbine, the exhaust may continue to flow downstream via the first branch onto the outlet (first) pipe (such as the first outlet pipe 424 in FIG. 3A) and from thereon may exit the exhaust assembly.

By adjusting exhaust flow to route hot exhaust first through the TWC, before flowing the exhaust through the remaining exhaust components (turbine and underbody converter), exhaust heat may be effectively transferred to the catalyst, expediting catalyst activation. In this way, hot exhaust may be effectively used for increasing TWC temperature without the requirement of spark retard, thereby increasing fuel efficiency of the engine. By flowing exhaust through the exhaust circuit, and transferring heat to a coolant, heat from the exhaust may be used to heat cylinder walls, and pitons. By increasing the temperature of the cylinder walls, and pistons hydrocarbon emissions from the engine may be reduced. Also, by routing the exhaust through the turbine, any delay in turbine spin-up may be reduced thereby reducing turbo-lag and enhancing boost performance. After exiting the exhaust assembly, at 810, the exhaust may flow towards the tailpipe. After passing through a muffler, the exhaust may be released to the atmosphere.

If it is determined (at 804) that the engine is not operating under cold-start conditions, it may be inferred that the catalyst has reached the light-off temperature and is functioning effectively for emissions control. At 812, the routine includes determining if the engine load is higher than a threshold load. The threshold load may correspond to a peak engine load beyond which there may be possibility of turbine component damage due to increased volume of hot exhaust flowing through the turbine.

If engine load is lower than the threshold load, the routine moves to 814 in order to operate the exhaust assembly in a second operating mode. Operating in the second mode, as described in relation to FIG. 4B, includes shifting each of the first four-way valve (valve_1), the second four-way valve (valve_2), the first three-way valve (valve_3), and the second three-way valve (valve_4) to their respective second positions.

At 816, by setting the exhaust assembly to the second operating mode, the entire volume of exhaust flowing downstream via the main exhaust passage may enter the first inlet pipe and continue to flow through the turbine housed in the first branch of the exhaust assembly. By flowing hot exhaust through the turbine, desired boost may be provided to the engine. Also, as the exhaust flows through the turbine, the temperature of the exhaust decreases. After exiting the turbine, the exhaust continues to flow downstream via the first branch onto the first outlet pipe. From thereon, the exhaust may be routed through the underbody converter housed in the second branch. After exiting the underbody converter, the exhaust may continue to flow towards the TWC housed in the third branch, via second inlet pipe. The temperature of exhaust passing though the TWC is lower compared to the temperature of exhaust entering the turbine in this mode, thereby facilitating optimal performance of the TWC. After exiting the TWC, the exhaust may exit the branched exhaust assembly via the second outlet pipe.

By adjusting exhaust flow to route hot exhaust first through the turbine, boost performance may be enhanced, and also the temperature of the exhaust may be reduced. Owing to the coating on the catalyst surface, the low temperature exhaust may facilitate a higher conversion efficiency of the TWC. After exiting the exhaust assembly (operated in second mode), at 822, the exhaust may flow towards the tailpipe. After passing through a muffler, the exhaust may be released to the atmosphere.

If it is determined (at 812) that the engine is load is higher than the threshold load, the routine moves to 818 in order to operate the exhaust assembly in the third operating mode. Operating in the third mode, as described in relation to FIG. 4C, includes maintaining each of the first four-way valve (valve_1), the second four-way valve (valve_2), the first three-way valve (valve_3), and the second the three-way valve (valve_4) in the second position, and actuating an injector (such as the injector 221 in FIG. 4A) coupled to the first branch upstream of the turbine to initiate cooling fluid injection to the exhaust flow.

At 820, by setting the exhaust assembly to the third operating mode, the entire volume of exhaust flowing downstream via the main exhaust passage may enter the first inlet pipe and continue to flow through the turbine housed in the first branch of the exhaust assembly. The exhaust entering the turbine may be cooled by the cooling fluid injected into the exhaust flow via the injector. In one example, the cooling fluid may be water. The amount of cooling fluid injected may be based on the exhaust temperature, and boost demand. For example, the controller may determine a control signal to send to the cooling fluid injector actuator, such as a pulse width of the signal being determined based on a determination of the exhaust temperature and boost demand. The exhaust temperature may be based on a measured exhaust temperature via an exhaust temperature sensor, or determined based on operating conditions such as engine speed, engine load, etc. The boost demand may also be estimated based on engine operating conditions such as engine speed, engine load, etc. The controller may determine the pulse width through a determination that directly takes into account a determined exhaust temperature, and boost demand, and alternatively the controller determine the pulse width based on a calculation using a look-up table with the input being exhaust temperature, and boost demand, and the output being pulse-width. In one example, the amount of cooling fluid injected may be increased with increase in exhaust temperature. In another example, the amount of cooling fluid injected may be decreased with increase in boost demand. By flowing cooler exhaust via the turbine, the possibility of boost error, and turbine hardware malfunction during high engine load conditions may be reduced. After exiting the turbine, the exhaust continues to flow downstream via the first branch onto the first outlet pipe. From thereon, the exhaust may be routed through the underbody converter housed in the second branch. After exiting the underbody converter, the exhaust may continue to flow towards the TWC housed in the third branch, via second inlet pipe. After exiting the TWC, the exhaust may exit the branched exhaust assembly via the second outlet pipe.

After exiting the exhaust assembly (operated in third mode), at 822, each of the first and the second portion of the exhaust may flow towards the tailpipe. After passing through a muffler, the entire volume of exhaust may be released to the atmosphere.

Figure 10:
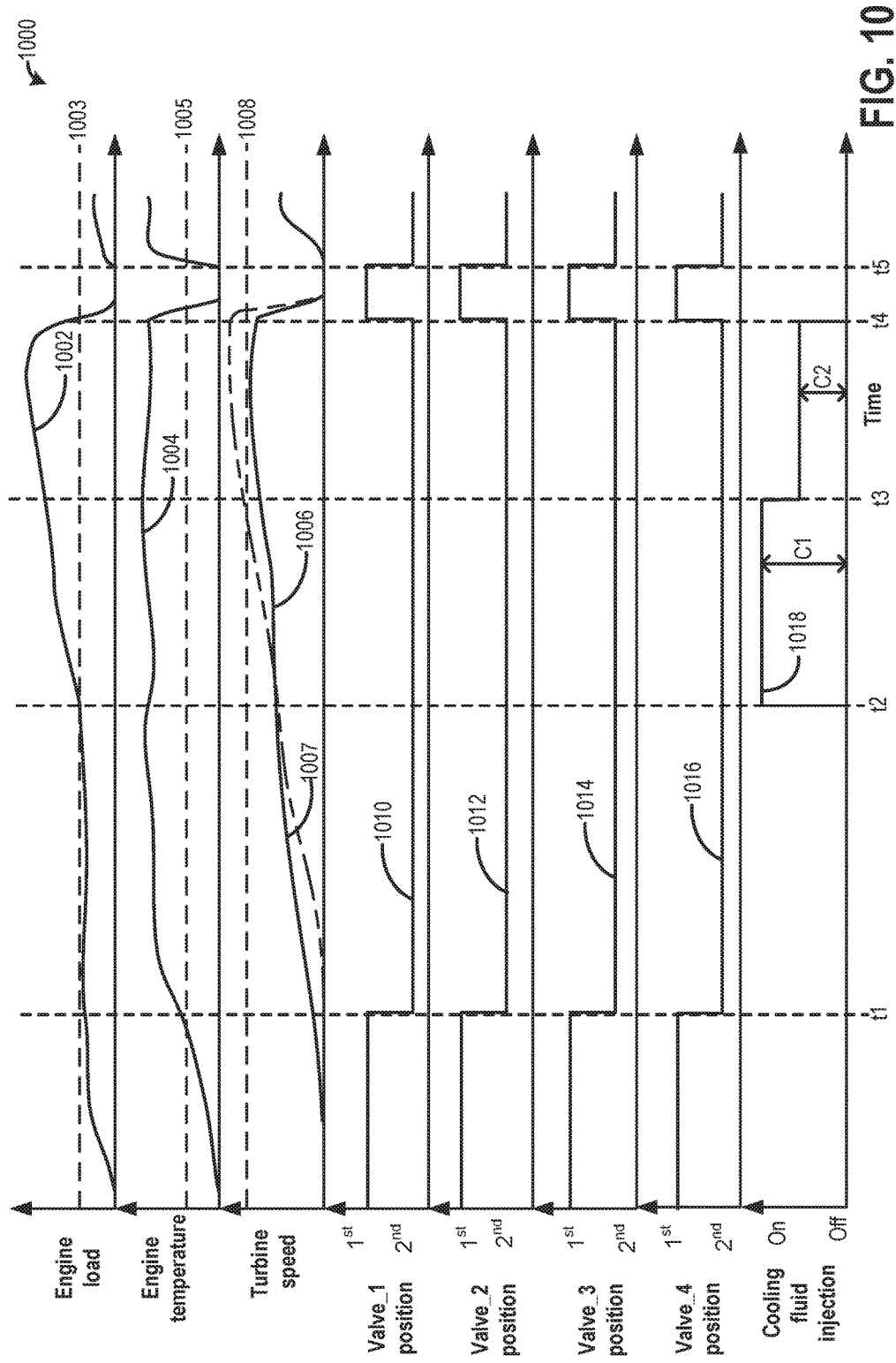
FIG. 10 shows an example operation of the second branched exhaust assembly.

FIG. 10 shows an example operating sequence 1000 illustrating operation of the branched exhaust assembly of FIG. 2. The direction of exhaust flow through the different flow-paths with different components is determined based on engine operating conditions and temperature requirement of each component. The horizontal (x-axis) denotes time and the vertical markers t1-t5 identify significant times in the operation of the exhaust bypass assembly system.

The first plot, line 1002, shows variation in engine load as estimated via a pedal position sensor, relative to a threshold load (as shown by dotted line 1003). The second plot, line 1004, shows change in engine temperature as estimated via an engine coolant temperature sensor, relative to a threshold temperature (as shown by dotted line 1005). The third plot, line 1006, shows variation in turbine speed over time. Dotted line 1007 shows turbine speed when exhaust flow through the turbine is not regulated via the branched exhaust assembly. Dotted line 1008 denotes a threshold turbine speed above which there may be a likelihood of damage to turbine components. The fourth plot, line 1010, shows a position of a first four-way valve (valve_1) coupled to the exhaust passage upstream of the branched exhaust assembly. The fifth plot, line 1012, shows a position of a second four-way valve (valve_2) coupled to the exhaust passage downstream of the branched exhaust assembly. The sixth plot, line 1014 shows a position of a diverter valve (valve_3) coupled to the first branch of the branched system at a junction with a first exhaust passage. The seventh plot, line 1016, shows a position of a three-way valve (valve_4) coupled to the junction of an exhaust channel, and a second exhaust passage. The eighth plot, line 1018, shows injection of a cooling fluid into exhaust stream upstream of a turbine via an injector.

Prior to time t1, the engine starts from rest after a period of inactivity during which the vehicle was not propelled. The engine may start under cold-start conditions due to the engine temperature being lower than threshold temperature 1005. During this time, the engine may be operated with a lower than threshold engine load (below the threshold load 1003). Below the threshold temperature, the engine may not be warm enough for three-way catalyst (such as the TWC 120 in FIG. 2) activation. Due to the cold-start conditions, the TWC (such as the TWC 120 in FIG. 2) coupled to the third branch of the exhaust assembly may not have attained its light-off temperature. In order to expedite catalyst warming, the controller may actuate each of the first valve (valve_1) and the second valve (valve_2) to their respective first positions to route hot exhaust first through the TWC. As a result of the selected valve setting, the entire volume of hot exhaust may first flow through the TWC, wherein heat from the exhaust may be utilized to increase the TWC temperature. After exiting the TWC, the exhaust may flow through the underbody converter (such as the underbody converter 118 in FIG. 2) coupled to the second branch of the exhaust assembly. In addition, the first three-way valve (valve_3), and the second three-way valve (valve_4) may be shifted to their respective first positions to route the entire amount exhaust via exhaust passages, and exhaust channels around the engine cylinders before flowing through the turbine. As exhaust flows through the exhaust channels, heat from the exhaust may be transferred to a coolant circulating through coolant channels encompassing the exhaust channels, and the recovered heat may be used to increase the temperature of the cylinder walls and the pistons. After flowing through the exhaust channels (around cylinders), the exhaust may return to the first branch of the branched assembly and then flow through the turbine (such as the turbine 116 in FIG. 2). At the turbine, a desired boost may be provided for engine operation.

At time t1, the engine temperature may exceed the threshold temperature (1005), indicating that the TWC has attained the light-off temperature and is activated. At this time, further engine heating may not be desired. As such, owing to a coating on the catalyst surface, the catalyst may have higher conversion efficiencies at lower exhaust temperatures. In order to route lower temperature exhaust through the TWC (for improved conversion efficiencies at the TWC), each of the first valve (valve_1), the second valve (valve_2), the first three-way valve (valve_3), and the second three-way valve (valve_4) may be shifted to their respective second positions. Between time t1 and t2, due to the given valve settings, the entire volume of hot exhaust may first flow through the turbine, wherein the exhaust may be utilized to further spin the turbine and meet the boost demand. If the exhaust was not routed through the turbine during the cold-start condition, the turbine would not have spun-up prior to t1 (as shown by plot 1007) and the time to reach the desired turbine speed (corresponding to desired boost) have been higher. As such, by initiating turbine spin-up prior to time t1, the time to torque may be reduced. The exhaust temperature reaching the TWC may be lower due to the exhaust reaching the TWC after flowing through the turbine. Consequently, optimal performance of the TWC may be facilitated. Also, by adjusting the exhaust flow to route the hot exhaust through the turbine before flowing the exhaust through the remaining exhaust components, turbo lag may be reduced.

At time t2, there is an increase in engine load to above the threshold load due to an increase in driver demand. Due to the higher load conditions, between time t2 and t3, the temperature and volume of exhaust may increase substantially and the entire volume of hot exhaust may not be routed through the turbine in order to reduce boost error and avoid damage to the turbocharger components. Therefore, during this time, in order to decrease the temperature of the exhaust entering the turbine, an amount of a cooling fluid (as denoted by the line C1) may be injected to thee exhaust flow upstream of the turbine. Due to the reduced temperature of the exhaust entering the turbine, the speed of the turbine may be maintained below the threshold speed. The amount of the cooling fluid injected may be adjusted based on driver demand and boost error. In this way, by cooling the exhaust before entering the turbine, possibility of turbine hardware damage may be reduced.

At time t3, there may be a further increase in engine load due to an increase in driver demand. In response to the higher driver demand, the speed of the turbine may be increased to provide the desired boost. Between time t3 and t4, a lower amount (as denoted by the line C2) of cooling fluid (compared to amount C1 injected between t2 and t3) may be injected to the exhaust flow entering the turbine. Due to warmer exhaust entering the turbine, the turbine speed may increase, however, the updated turbine speed may be continued to be maintained below the threshold. As an example, between time t2 and t4, if a portion of the exhaust was not cooled before entering the turbine, as shown by line 1007, the turbine speed may have increased to above the threshold level, thereby increasing possibility of turbine hardware damage.

At time t4, an engine shutdown request is received, responsive to which engine fueling is discontinued, and the engine is spun down to rest. Owing to this, engine speed and engine load may reduce. Responsive to the engine shutdown request, each of the valve_1, valve_2, and valve_3 may be shifted to their respective first positions. The first positions of each of the three valves may be the default setting of the valves during an engine shut-down. Between time t4 and t5, the engine continues to be shut down and engine temperature is not measured. At time t5, an engine restart request is received responsive to which the engine starts from rest. Herein the engine is restarted after a shorter duration while the engine temperature is above the threshold temperature 1005. Therefore, the engine may start under hot-start conditions. Due to the higher engine temperature at the restart, each of the three valves (valve_1, valve_2, valve_3, and valve_4) may be shifted to their respective second positions. Due to the given valve setting, the entire volume of hot exhaust may first flow through the turbine, wherein a boost may be provided to the engine and also the exhaust temperature may be reduced. After exiting the turbine, the lower temperature exhaust may flow through the underbody converter and then through the TWC. After time t4, the exhaust assembly may continue to operate in this mode.

In this way, by housing distinct exhaust components in different branches (and a bypass passage) of a branched exhaust assembly, exhaust flow through the components may be varied. For example, on order of exhaust flow may be varied and one or more components may be at least partially bypassed despite their order relative to one another. By flowing exhaust through distinct exhaust components housed on different branches of a branched exhaust assembly, it may be possible to expedite attainment of catalyst light-off temperature while providing boost to the engine during cold-start conditions. Exhaust may be routed to flow through each of the exhaust components in different directions based on engine operating conditions and temperature requirement of the respective components. The technical effect of recovering exhaust heat during cold-start conditions is that engine heating may be expedited with a corresponding reduction in cold-start emissions. Also, by opportunistically injecting a cooling liquid upstream of the turbine, a temperature of exhaust flowing through the turbine may be controlled, especially during conditions of higher engine load, thereby reducing damage to turbine hardware. Overall, by adjusting the order of exhaust flow through each exhaust component engine efficiency, emissions quality, engine performance, and fuel efficiency may be improved.

In one example, a method comprises, during cold-start, flowing exhaust first through a three-way catalyst, then an underbody converter, then an exhaust bypass passage with a heat exchanger and then a turbine, transferring heat from exhaust to coolant circulating through the heat exchanger, and heating an engine cylinder and piston with exhaust heat recovered at the heat exchanger. The preceding example method further comprising, additionally or optionally, after three-way catalyst light-off, flowing exhaust first through the turbine, then through the underbody converter and then through the three-way catalyst, and during higher than threshold load operations, flowing a first portion of exhaust first through the heat exchanger, then the turbine, the underbody converter, and finally through the three-way catalyst, and simultaneously flowing a second portion of exhaust first through the turbine, then the underbody converter, and finally the three-way catalyst, bypassing the heat exchanger. In any or all of the preceding examples, a ratio of the first portion to the second portion is additionally or optionally adjusted based on driver demand and boost error, the adjusting including decreasing the first portion while correspondingly increasing the second portion as the driver demand increases, and increasing the first portion while correspondingly decreasing the second portion as the boost error increases, the boost error including a difference between an actual boost and a desired boost. In any or all of the preceding examples, additionally or optionally, the turbine is housed in a first branch, the underbody converter is housed in a second branch, and the three-way catalyst is housed in a third branch of a branched exhaust assembly, the first branch, the second branch, and the third branch fluidically connected to each other via each of a first four-way valve and a second four-way valve. In any or all of the preceding examples, additionally or optionally, the exhaust bypass passage is coupled to the first branch upstream of the turbine via a diverter valve, and the heat exchanger is housed in the exhaust bypass passage. In any or all of the preceding examples, additionally or optionally, the first four-way valve is coupled to each of a first end of the first branch, a first end of the second branch, and a first end of the third branch, the second four-way valve is coupled to each of a second end of the first branch, a second end of the second branch and a second end of the third branch, and the diverter valve is coupled to the first branch at a junction with the exhaust bypass passage. In any or all of the preceding examples, additionally or optionally, flowing exhaust during the cold-start includes flowing exhaust first through the three-way catalyst in a first direction, then flowing exhaust through the underbody converter in a second direction, and then flowing exhaust through the heat exchanger in the first direction, and the flowing exhaust through the turbine in the first direction, the second direction is opposite to the first direction, wherein flowing exhaust after three-way catalyst light-off includes flowing exhaust first through the turbine in the first direction, then through the underbody converter in the second direction, and then through the three-way catalyst in the first direction, and wherein flowing exhaust enduring higher than threshold load conditions include flowing a first portion of exhaust first through the heat exchanger in the first direction, then through the turbine in the first direction, then through the underbody converter in the second direction, and then through the three-way catalyst in the first direction, and simultaneously flowing a second portion of exhaust through the turbine in the first direction, then through the underbody converter in the second direction, and then through the three-way catalyst in the first direction bypassing the heat exchanger. In any or all of the preceding examples, additionally or optionally, flowing exhaust during the cold-start further includes actuating the first four-way valve to a first position, the second four-way valve to a first position, and the diverter valve to an open position, wherein flowing exhaust after three-way catalyst light-off further includes actuating the first valve to a second position, the second valve to a second position, and the diverter valve to a closed position, and wherein flowing exhaust during higher than threshold load operation further includes actuating the first valve to the second position, the second valve to the second position, and the diverter valve to a partly open position.

In another example, an engine method comprises during a first mode, flowing exhaust first through a three-way catalyst housed in a third branch, then an underbody converter housed in a second branch, then a first exhaust passage, an exhaust channel, a second exhaust passage, and then a turbine housed in a first branch of a branched exhaust system, transferring heat from exhaust flowing through the exhaust channel to coolant circulating via a concentric coolant channel, and heating an engine cylinder and piston with exhaust heat recovered by the coolant. The preceding example method further comprising, additionally or optionally, during a second mode, flowing exhaust first through the turbine, then the underbody converter, and then the three-way catalyst; and during a third mode, flowing exhaust first through the turbine, then the underbody converter, and then the three-way catalyst, and injecting a cooling fluid to the exhaust upstream of the turbine. In any or all of the preceding examples, additionally or optionally, operating in the first mode includes shifting a position of a first four-way valve coupled to a first end of each of the first branch, the second branch, and the third branch to a first position, shifting a position of a second four-way valve coupled to a second end of each of the first branch, the second branch, and the third branch to a first position, shifting a position of a first three-way valve coupled to a junction of the first branch, and the first exhaust passage to a first position, and shifting a position of a second three-way valve coupled to a junction of the second exhaust passage, and the exhaust channel to a first position, and operating in each of the second mode, and the third mode include shifting the position of the first four-way valve to a second position, shifting the position of the second four-way valve to a second position, shifting the position of the first three-way valve to a closed position, and shifting the position of the second three-way valve to a second position. Any or all of the preceding examples further comprises, additionally or optionally, selecting the first mode when engine temperature is below a threshold temperature, selecting the second mode when engine temperature is above the threshold temperature, and engine load is lower than a threshold load, the threshold based on the three-way catalyst light-off temperature, and selecting the third mode when engine load is higher than the threshold load. In any or all of the preceding examples, injecting a cooling fluid includes injecting a cooling fluid into the exhaust, upstream of the turbine, via an injector, an amount of cooling fluid injected adjusted based on each of driver demand and boost error. In any or all of the preceding examples, additionally or optionally, the cooling fluid is water, and wherein the adjusting includes decreasing the amount of cooling fluid injected as the driver demand increases, and increasing the amount as the boost error increases, the boost error including a difference between an actual boost and a desired boost. In any or all of the preceding examples, additionally or optionally, each of the first mode, the second mode and the third mode include flowing exhaust through the first branch in a first direction, flowing exhaust through the second branch in a second direction, and flowing exhaust through the third branch in the first direction, the first direction opposite to the second direction. Any or all of the preceding examples further comprising, additionally or optionally, transitioning from the first mode to the second mode responsive to activation of the three-way catalyst, transitioning from the second mode to the third mode responsive to an increase in demanded torque, and transitioning from the third mode to the first mode responsive to an engine shutdown request.

In yet another example, an engine system comprises an engine including an exhaust manifold, a pedal position sensor, a branched exhaust assembly with a first branch, a second branch, a third branch, a bypass passage, a first valve, a second valve, and a third valve, a turbocharger with a turbine coupled to the first branch of the branched exhaust assembly, the turbine connected to a compressor, an underbody converter coupled to the second branch of the exhaust assembly, a three-way catalyst coupled to the third branch of the exhaust assembly, a heat exchanger coupled to the bypass passage, the heat exchanger fluidically coupled to an engine coolant system, an engine coolant temperature sensor coupled to the engine coolant system, and a controller with computer readable instructions stored on non-transitory memory for: estimating an engine temperature, and engine load via the one or more of the engine coolant temperature sensor and the pedal position sensor, selecting an order of flowing exhaust through each of the turbine, the underbody converter, and the three-way catalyst as a function of the estimated engine temperature and engine load, and actuating each of the first valve, the second valve, and the third valve to flow exhaust through each of the turbine, the underbody converter, and the three-way catalyst via each of the first branch, the second branch, and the third branch according to the selected order of exhaust flow. In the preceding example, additionally or optionally, the selecting includes, during a first condition where the engine temperature is below a threshold temperature, actuating the first valve to a first position, the second valve to a first position, and the third valve to an open position to flow exhaust first through the third branch with the three-way catalyst, then through the second branch with the underbody converter, then through the bypass passage with the heat exchanger, and then through the first branch with the turbine, during a second condition where the engine temperature is above the threshold temperature and the engine load is below a threshold engine load, actuating the first valve to a second position, the second valve to a second position, and the third valve to a closed position to flow exhaust first through the first branch with the turbine, then through the second branch with the underbody converter, and then through the third branch with the three-way catalyst, and during a third condition where the engine temperature is above the threshold temperature and the engine load is above the threshold engine load actuating the first valve to the second position, the second valve to the second position, and the third valve to a partly open position to flow a first portion of exhaust first through the bypass passage with the heat exchanger, then through the first branch with the turbine, then through the second branch with the underbody converter, and then through the third branch with the three-way catalyst, and flowing a second portion of exhaust first through the first branch with the turbine, then through the second branch with the underbody converter, and then through the third branch with the three-way catalyst, bypassing the heat exchanger. In any or all of the preceding examples, additionally or optionally, the controller includes further instructions for: during the first condition, circulating a coolant through the heat exchanger, transferring heat from exhaust flowing through the heat exchanger to the circulating coolant, then circulating heated coolant through conduits concentrically arranged around a plurality of engine cylinders, and transferring heat from the coolant to the engine cylinders. In any or all of the preceding examples, additionally or optionally, the controller includes further instructions for: during the first condition, transferring heat from exhaust flowing through an exhaust line to a plurality of coolant lines, and then transferring heat from the plurality of coolant lines to the engine cylinders, wherein the exhaust lines are arranged concentrically around the plurality of coolant lines, each coolant line arranged concentrically around an outer surface of an engine cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during cold-start, flowing exhaust first through a three-way catalyst, then an underbody converter, then an exhaust bypass passage with a heat exchanger and then a turbine;
   transferring heat from exhaust to coolant circulating through the heat exchanger; and
   heating an engine cylinder and piston with exhaust heat recovered at the heat exchanger.

2. The method of claim 1, further comprising, after three-way catalyst light-off, flowing exhaust first through the turbine, then through the underbody converter and then through the three-way catalyst; and
   during higher than threshold load operations, flowing a first portion of exhaust first through the heat exchanger, then the turbine, the underbody converter, and finally through the three-way catalyst, and simultaneously flowing a second portion of exhaust first through the turbine, then the underbody converter, and finally the three-way catalyst, bypassing the heat exchanger.

3. The method of claim 2, wherein a ratio of the first portion to the second portion is adjusted based on driver demand and boost error, the adjusting including decreasing the first portion while correspondingly increasing the second portion as the driver demand increases, and increasing the first portion while correspondingly decreasing the second portion as the boost error increases, the boost error including a difference between an actual boost and a desired boost.

4. The method of claim 1, wherein the turbine is housed in a first branch, the underbody converter is housed in a second branch, and the three-way catalyst is housed in a third branch of a branched exhaust assembly, the first branch, the second branch, and the third branch fluidically connected to each other via each of a first four-way valve and a second four-way valve.

5. The method of claim 4, wherein the exhaust bypass passage is coupled to the first branch upstream of the turbine via a diverter valve, and the heat exchanger is housed in the exhaust bypass passage.

6. The method of claim 5, wherein the first four-way valve is coupled to each of a first end of the first branch, a first end of the second branch, and a first end of the third branch, the second four-way valve is coupled to each of a second end of the first branch, a second end of the second branch and a second end of the third branch, and the diverter valve is coupled to the first branch at a junction with the exhaust bypass passage.

7. The method of claim 2, wherein flowing exhaust during the cold-start includes flowing exhaust first through the three-way catalyst in a first direction, then flowing exhaust through the underbody converter in a second direction, and then flowing exhaust through the heat exchanger in the first direction, and the flowing exhaust through the turbine in the first direction, the second direction is opposite to the first direction;
   wherein flowing exhaust after three-way catalyst light-off includes flowing exhaust first through the turbine in the first direction, then through the underbody converter in the second direction, and then through the three-way catalyst in the first direction; and
   wherein flowing exhaust enduring higher than threshold load conditions include flowing a first portion of exhaust first through the heat exchanger in the first direction, then through the turbine in the first direction, then through the underbody converter in the second direction, and then through the three-way catalyst in the first direction, and simultaneously flowing a second portion of exhaust through the turbine in the first direction, then through the underbody converter in the second direction, and then through the three-way catalyst in the first direction bypassing the heat exchanger.

8. The method of claim 5, wherein flowing exhaust during the cold-start further includes actuating the first four-way valve to a first position, the second four-way valve to a first position, and the diverter valve to an open position, wherein flowing exhaust after three-way catalyst light-off further includes actuating the first valve to a second position, the second valve to a second position, and the diverter valve to a closed position, and wherein flowing exhaust during higher than threshold load operation further includes actuating the first valve to the second position, the second valve to the second position, and the diverter valve to a partly open position.

9. An engine method, comprising:
   during a first mode,
      flowing exhaust first through a three-way catalyst housed in a third branch, then an underbody converter housed in a second branch, then a first exhaust passage, an exhaust channel, a second exhaust passage, and then a turbine housed in a first branch of a branched exhaust system;
      transferring heat from exhaust flowing through the exhaust channel to coolant circulating via a concentric coolant channel; and
      heating an engine cylinder and piston with exhaust heat recovered by the coolant.

10. The method of claim 9, further comprising, during a second mode, flowing exhaust first through the turbine, then the underbody converter, and then the three-way catalyst; and
   during a third mode, flowing exhaust first through the turbine, then the underbody converter, and then the three-way catalyst, and injecting a cooling fluid to the exhaust upstream of the turbine.

11. The method of claim 10, wherein operating in the first mode includes shifting a position of a first four-way valve coupled to a first end of each of the first branch, the second branch, and the third branch to a first position, shifting a position of a second four-way valve coupled to a second end of each of the first branch, the second branch, and the third branch to a first position, shifting a position of a first three-way valve coupled to a junction of the first branch, and the first exhaust passage to a first position, and shifting a position of a second three-way valve coupled to a junction of the second exhaust passage, and the exhaust channel to a first position, and operating in each of the second mode, and the third mode include shifting the position of the first four-way valve to a second position, shifting the position of the second four-way valve to a second position, shifting the position of the first three-way valve to a second position, and shifting the position of the second three-way valve to a second position.

12. The method of claim 10, further comprising, selecting the first mode when engine temperature is below a threshold temperature, selecting the second mode when engine temperature is above the threshold temperature and engine load is lower than a threshold load, the threshold based on the three-way catalyst light-off temperature, and selecting the third mode when engine load is higher than the threshold load.

13. The method of claim 10, wherein injecting a cooling fluid includes injecting a cooling fluid into the exhaust, upstream of the turbine, via an injector, an amount of cooling fluid injected adjusted based on each of driver demand and boost error.

14. The method of claim 13, wherein the cooling fluid is water, and wherein the adjusting includes decreasing the amount of cooling fluid injected as the driver demand increases, and increasing the amount as the boost error increases, the boost error including a difference between an actual boost and a desired boost.

15. The method of claim 10, wherein each of the first mode, the second mode and the third mode include flowing exhaust through the first branch in a first direction, flowing exhaust through the second branch in a second direction, and flowing exhaust through the third branch in the first direction, the first direction opposite to the second direction.

16. The method of claim 10, further comprising, transitioning from the first mode to the second mode responsive to activation of the three-way catalyst, transitioning from the second mode to the third mode responsive to an increase in demanded torque, and transitioning from the third mode to the first mode responsive to an engine shutdown request.

17. An engine system, comprising:
an engine including an exhaust manifold;
a pedal position sensor;
a branched exhaust assembly with a first branch, a second branch, a third branch, a bypass passage, a first valve, a second valve, and a third valve;
a turbocharger with a turbine coupled to the first branch of the branched exhaust assembly, the turbine connected to a compressor;
an underbody converter coupled to the second branch of the exhaust assembly;
a three-way catalyst coupled to the third branch of the exhaust assembly;
a heat exchanger coupled to the bypass passage, the heat exchanger fluidically coupled to an engine coolant system;
an engine coolant temperature sensor coupled to the engine coolant system; and
a controller with computer readable instructions stored on non-transitory memory for:
estimating an engine temperature, and engine load via the one or more of the engine coolant temperature sensor and the pedal position sensor;
selecting an order of flowing exhaust through each of the turbine, the underbody converter, and the three-way catalyst as a function of the estimated engine temperature and engine load; and
actuating each of the first valve, the second valve, and the third valve to flow exhaust through each of the turbine, the underbody converter, and the three-way catalyst via each of the first branch, the second branch, and the third branch according to the selected order of exhaust flow.

18. The system of claim 17, wherein the selecting includes, during a first condition where the engine temperature is below a threshold temperature, actuating the first valve to a first position, the second valve to a first position, and the third valve to an open position to flow exhaust first through the third branch with the three-way catalyst, then through the second branch with the underbody converter, then through the bypass passage with the heat exchanger, and then through the first branch with the turbine;
during a second condition where the engine temperature is above the threshold temperature and the engine load is below a threshold engine load, actuating the first valve to a second position, the second valve to a second position, and the third valve to a closed position to flow exhaust first through the first branch with the turbine, then through the second branch with the underbody converter, and then through the third branch with the three-way catalyst; and
during a third condition where the engine temperature is above the threshold temperature and the engine load is above the threshold engine load actuating the first valve to the second position, the second valve to the second position, and the third valve to a partly open position to flow a first portion of exhaust first through the bypass passage with the heat exchanger, then through the first branch with the turbine, then through the second branch with the underbody converter, and then through the third branch with the three-way catalyst, and flowing a second portion of exhaust first through the first branch with the turbine, then through the second branch with the underbody converter, and then through the third branch with the three-way catalyst, bypassing the heat exchanger.

19. The system of claim 18, wherein the controller includes further instructions for: during the first condition, circulating a coolant through the heat exchanger, transferring heat from exhaust flowing through the heat exchanger to the circulating coolant, then circulating heated coolant through conduits concentrically arranged around a plurality of engine cylinders, and transferring heat from the coolant to the engine cylinders.

20. The system of claim 19, wherein the controller includes further instructions for: during the first condition, transferring heat from exhaust flowing through an exhaust line to a plurality of coolant lines, and then transferring heat from the plurality of coolant lines to the engine cylinders, wherein the exhaust lines are arranged concentrically around the plurality of coolant lines, each coolant line arranged concentrically around an outer surface of an engine cylinder.

* * * * *